US 6,674,596 B1

United States Patent
Takayama

(10) Patent No.: US 6,674,596 B1
(45) Date of Patent: Jan. 6, 2004

(54) MEMORY IN CASSETTE HAS USE RESTRICTION RECORDED IN READ-ONLY MEMORY

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/524,909

(22) Filed: Mar. 14, 2000

(30) Foreign Application Priority Data

Mar. 17, 1999 (JP) .......................................... P11-072042

(51) Int. Cl.⁷ .............................................. G11B 15/18
(52) U.S. Cl. ....................................................... 360/69
(58) Field of Search .......................... 360/69, 71, 72.1, 360/132, 60

(56) References Cited

U.S. PATENT DOCUMENTS

| | | | | | |
|---|---|---|---|---|---|
| 5,615,056 A | * | 3/1997 | Oguro | ....................... | 386/104 |
| 5,852,534 A | * | 12/1998 | Ozue et al. | ..................... | 360/69 |
| 5,926,607 A | * | 7/1999 | Oguro et al. | .................. | 386/95 |
| 6,088,182 A | * | 7/2000 | Taki et al. | ..................... | 360/71 |
| 6,091,884 A | * | 7/2000 | Yuen et al. | .................... | 386/83 |
| 6,301,065 B1 | * | 10/2001 | Oguro | ....................... | 360/19.1 |

* cited by examiner

*Primary Examiner*—Andrew L. Sniezek
*Assistant Examiner*—K. Wong
(74) *Attorney, Agent, or Firm*—Jay H. Maioli

(57) ABSTRACT

A tape drive unit and record medium for use in a data streamer in which the tape cassette includes in addition to a magnetic tape a solid-state memory. By detecting a correspondence between data on the tape and data in the memory, various operations of the tape drive unit can be controlled, so that it is not possible to write over or erase data already recorded on the tape. The tape can be divided into partitions such that it is not necessary to rewind the tape to the beginning when it is desired to record new data.

19 Claims, 21 Drawing Sheets

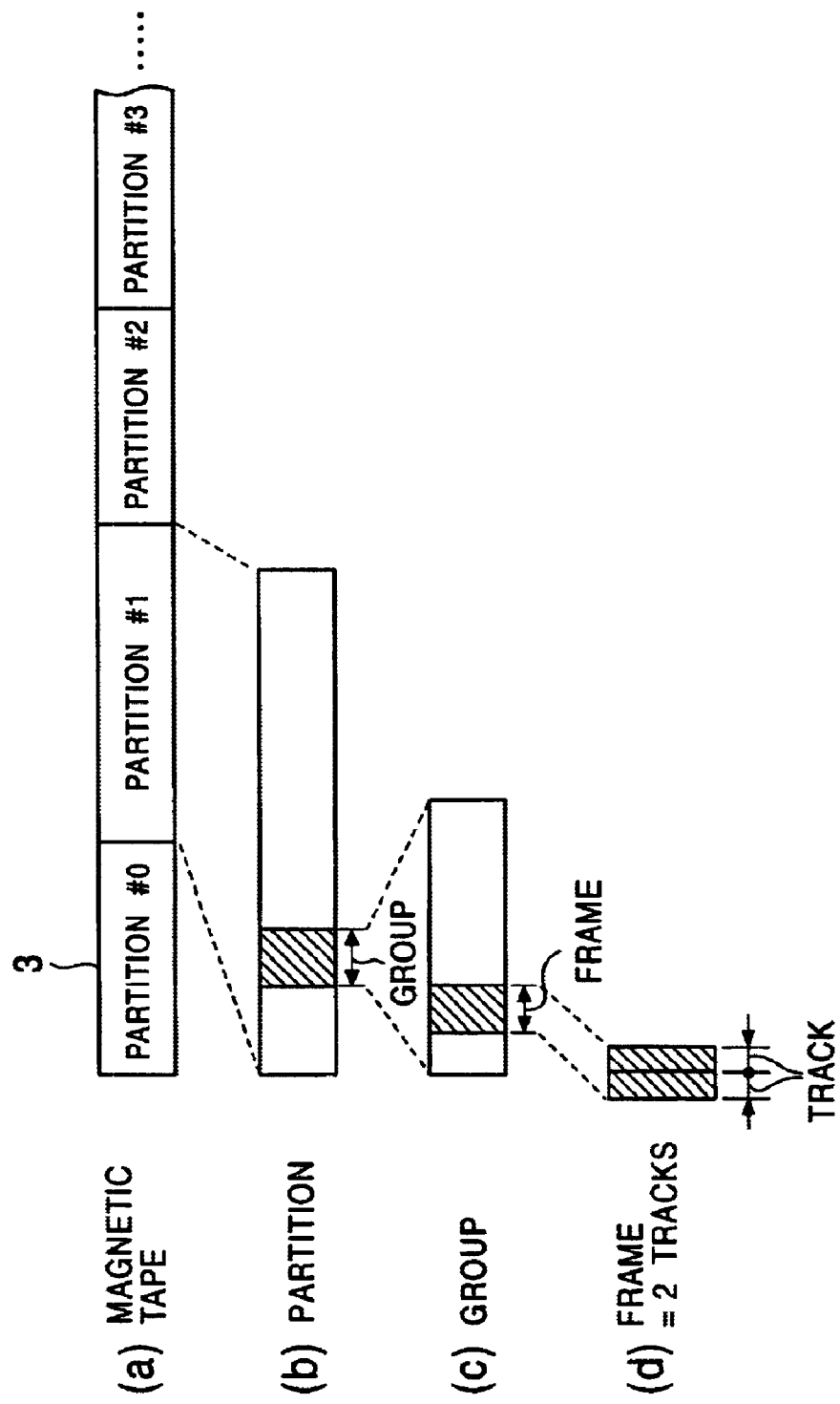

FIG. 11

| RAW FORMAT ID | | 16 BITS |
|---|---|---|
| LOGICAL FORMAT ID | | 8 BITS |
| LOGICAL FRAME ID | LAST FRAME ID | 1 BIT |
| | ECC FRAME ID | 1 BIT |
| | LOGICAL FRAME NUMBER | 6 BITS |
| PARTITION ID | | 16 BITS |
| AREA ID | | 4 BITS |
| DATA ID | | 4 BITS |
| N POSITION | | 4 BITS |
| N-REPEATS | | 4 BITS |
| GROUP COUNT | | 24 BITS |
| FILE-MARK COUNT | | 32 BITS |
| SAVE-SET MARK COUNT | | 32 BITS |
| RECORD COUNT | | 32 BITS |
| ABSOLUTE FRAME COUNT | | 24 BITS |
| RESERVED | | |

FIG. 15

| VOLUME TAG (FL3) | VOLUME INFORMATION CHECKSUM |
| | VOLUME INFORMATION |
| | ACCUMULATIVE PARTITION INFORMATION CHECKSUM |
| | ACCUMULATIVE PARTITION INFORMATION |
| | VOLUME NOTE CHECKSUM |
| | VOLUME NOTE |
| | CARTRIDGE SERIAL NUMBER |
| | MANUFACTURER ID |
| | SECONDARY ID |
| | CARTRIDGE SERIAL NUMBER PART CHECKSUM |
| | RESERVED |
| | SPECIFIC VOLUME TAG 1 |
| | SPECIFIC VOLUME TAG 2 |
| | SPECIFIC VOLUME TAG 3 |
| | SPECIFIC VOLUME TAG 4 |
| | SPECIFIC VOLUME TAG 5 |
| | SPECIFIC VOLUME TAG 6 |
| | SPECIFIC VOLUME TAG 7 |
| | SPECIFIC VOLUME TAG 8 |
| | SPECIFIC VOLUME TAG 9 |
| | SPECIFIC VOLUME TAG 10 |
| | SPECIFIC VOLUME TAG 11 |
| | SPECIFIC VOLUME TAG 12 |
| | SPECIFIC VOLUME TAG 13 |

FIG. 16A

| | | |
|---|---|---|
| FL31 | VOLUME INFORMATION CHECKSUM | 1 BYTE |
| | EJECT STATUS | 20 BYTES |
| | REEL DIAMETER | 4 BYTES |
| | RESERVED | 1 BYTE |
| | INITIALIZE COUNT | 3 BYTES |
| | VOLUME INFORMATION ON TAPE | 72 BYTES — FL311 |

FIG. 16B

| | | | |
|---|---|---|---|
| RESERVED | | | 4 BYTES |
| RESERVED | | | 2 BYTES |
| RESERVED | b6, b7, b8 | 3 BITS | 1 BYTE |
| SUPER HIGH SPEED SEARCH ENABLE FLAG | b5 | 1 BIT | |
| SYSTEM LOG ALLOCATION FLAGS | b3, b4 | 2 BITS | |
| ALWAYS UNLOAD P.B.O.T. FLAG | b2 | 1 BIT | |
| AIT NATIVE FLAG | b1 | 1 BIT | |
| LAST VALID PARTITION NUMBER | | | 1 BYTE |
| OPTIONAL DEVICE AREA ALLOCATION MAP | | | 32 BYTES |
| RESERVED | | | 32 BYTES |

FL311 (72 BYTES)

FIG. 21

| USE NUMBER | USE | RESTRICTION |
|---|---|---|
| 0 | GENERAL | NONE |
| 1 | DATA DISTRIBUTION, FIRMWARE UPDATING, ETC. | INVALID COMMAND: FORMAT, MODE SELECT PAGE 11h, ERASE, WRITE, WRITE FM, DELETE, APPEND, ETC. |
| 2 | WORM | ONLY ADDITIONAL WRITING OR READING CAN BE PERFORMED. INVALID COMMAND: FORMAT, MODE SELECT PAGE 11h, ERASE, DELETE, APPEND, ETC. |
| OTHER | RESERVE | TRANSFER TO UNLOADING-AWAITING CONDITION |

FL11

MEMORY IN CASSETTE HAS USE RESTRICTION RECORDED IN READ-ONLY MEMORY

BACKGROUND OF THE INVENTION

1. Field of the Invention

This invention relates generally to tape drive units intended for maintaining data written on a magnetic tape and to recording media for use therewith.

2. Description of the Related Art

A type of recording media is known in which data can be written only once in a particular recording area. Since the recording media of this type are used as additionally writable or read-only recording media, they are called, for example, write only read many or WORM. As a WORM recording medium, a type of optical disk called a CD-R or compact disk recordable is known, in which data are written by physically forming pits on the disk recording surface. Accordingly, CD-Rs excel in data protection because it is impossible to change the data once it has been written.

A so-called tape streamer drive has recently been in wide use as a drive unit for writing/reading digital data to/from a magnetic tape. This tape streamer drive can have a large recording capacity of approximately several dozen to several hundred gigabytes, although the capacity varies according to the length of the recording tape in the tape cassette. Accordingly, the tape streamer drive has various uses, such as a backup of data written on a hard disk of a computer. The tape streamer drive is also suitable for storing image data, which typically involves a large amount of data.

The magnetic tape has a recording capacity greater than that of a CD-R, and this reduces the cost per bit unit for the whole recording capacity of the recording medium. Thus, it is possible that the tape cassette can be used as a WORM recording medium.

Data written on the magnetic tape, however, may be erased if some faulty operations are performed when the tape cassette is loaded into the tape drive unit. The data written on the magnetic tape can also be intentionally rewritten. Accordingly, there is a problem in that the magnetic tape does not excel in the protection of important data.

OBJECT AND SUMMARY OF THE INVENTION

Accordingly, it is an object of the present invention to provide an apparatus and record medium for use in a data streamer that can eliminate the above-noted defects inherent in the prior art.

According to one aspect of the present invention a tape drive unit includes a tape drive in which, when a tape cassette including a magnetic tape is loaded, the tape drive runs the magnetic tape and writes/reads information to/from the magnetic tape; a memory drive in which, when the loaded tape cassette includes a memory for storing management information for managing the writing/reading of information to/from the magnetic tape, the memory drive can read or write the management information by performing predetermined communication processing with a memory; a use-recognition-information detecting circuit for detecting, from the memory, use-recognition information designating a use for the tape cassette; and a controller in which, when a predetermined operation command is supplied, the controller means performs an operation on the magnetic tape, based on the use-recognition information.

According to another aspect of the present invention, a tape drive unit includes a tape drive in which, when a tape cassette including a magnetic tape is loaded, the tape drive runs the magnetic tape and writes/reads information to/from the magnetic tape; a memory drive in which, when the loaded tape cassette includes a memory for storing management information for managing the writing/reading of information to/from the magnetic tape, the memory drive can read or write the management information by performing predetermined communication processing with the memory; a first identification-information detecting circuit for detecting identification information of the tape cassette stored in the memory; a second identification-information detecting circuit for detecting identification information of the tape cassette stored in the magnetic tape; an identification-information determining circuit for determining whether the two types of identification information, detected by the first and second identification-information detecting circuits, coincide with each other; and a controller for executing only a particular operation based on a result of the determination by the identification-information determining circuit.

In another aspect of the present invention a record medium is provided that includes a tape cassette including a magnetic tape; and a memory built into the tape cassette, which stores management information for managing writing/reading to/from the magnetic tape; the memory stores use-recognition information designating a use for the tape cassette. In another example, identification information of the tape cassette are stored in the memory and the magnetic tape.

Since a tape drive unit of the present invention controls operations relative to a tape cassette based on use-recognition information, the tape drive unit inhibits the execution of processes, such as the erasing and rewriting of written data requiring protection, thereby preventing the content of the data from being changed.

Only when identification information on a magnetic tape and identification information in a memory coincide with each other, are particular operations allowed, such as reading from and writing to the magnetic tape. This enables protection of written data in a tape cassette in which, for example, a magnetic tape or memory is exchanged.

Since a recording medium of the present invention stores use-recognition information for instructing a memory regarding a use for which a tape cassette is adapted, the recording medium can inform the use for the recording medium to a tape drive unit into which the tape cassette is loaded.

Moreover, since a memory and a magnetic tape store identification information such as a tape cassette's serial number, the correspondence between the memory and the magnetic tape, which are included in the same tape cassette, can be established. Thereby, when identification information detected from the memory and identification information detected from the magnetic tape do not coincide, a drive unit into which a tape cassette is loaded can restrict writing and reading operations.

BRIEF DESCRIPTION OF DRAWINGS

FIG. 6 consists of illustrations of structures of data on a magnetic tape in a tape cassette according to an embodiment of the present invention.

FIG. 11 is an illustration of ID area information in a tape cassette according to an embodiment of the present invention.

FIG. 15 is an illustration of an MIC volume tag in an embodiment of the present invention.

FIGS. 16A and 16B are illustrations of MIC volume information in an embodiment of the present invention.

FIG. 21 is an illustration of a write once-read many (WORM) flag.

DETAILED DESCRIPTION OF PREFERRED EMBODIMENTS

The present Applicant involves various embodiments relating to a tape cassette provided with a nonvolatile memory and a tape drive unit that is, a tape streamer drive, for writing/reading digital data to/from the memory-included tape cassette. In these embodiments, the present invention is applied to a data storage system consisting of a memory-included tape cassette and a tape streamer drive.

The embodiments are described in the following order:
1. Structure of the Tape Cassette;
2. Structure of the Remote Memory Chip;
3. Structure of the Tape streamer drive;
4. Structure of the Data on Magnetic Tape;
5. ID Area;
6. Data Structure in the Remote Memory Chip; and
7. Operation Control for WORM operation.

Structure of the Tape Cassette

Figure 3A:
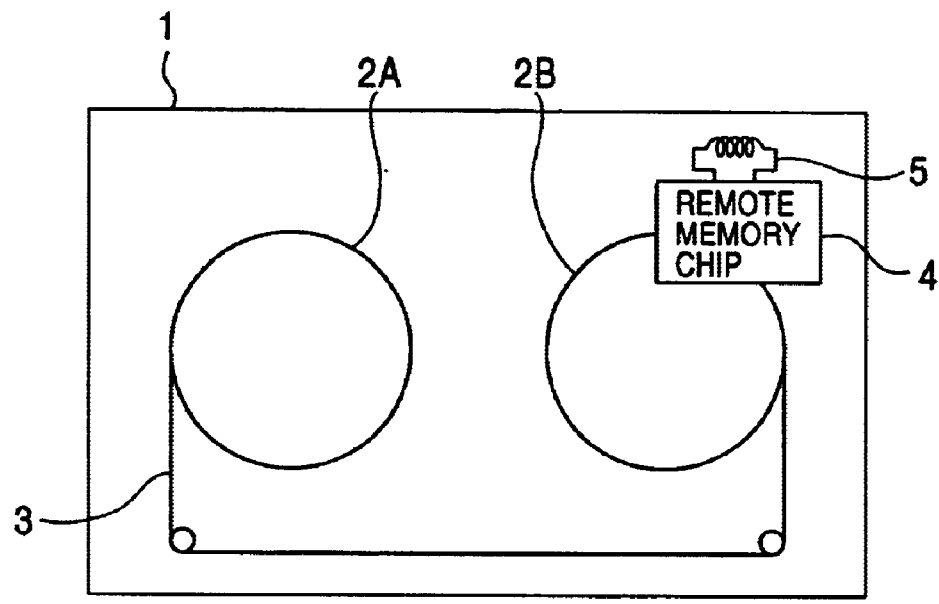
FIGS. 3A and 3B are schematic drawings illustrating tape cassettes according to an embodiment of the present invention.

A tape cassette adapted for a tape streamer drive, according to an embodiment of the present invention, is described with reference to FIGS. 3A, 3B, and FIG. 4, in which FIG. 3A shows the internal structure of a tape cassette provided with a remote memory chip. In the tape cassette 1 shown in FIG. 3A, reels 2A and 2B are provided, and a magnetic tape 3 having a width of 8 mm is provided between the reels 2A and 2B.

The tape cassette 1 is provided with a remote memory chip 4 including a nonvolatile memory and a control circuit therefor. The remote memory chip 4 can transmit data by performing radio communication with a remote memory interface 30 of FIG. 1, in a tape streamer drive using an antenna 5.

The remote memory chip 4 stores manufacture information and serial number information of each tape cassette, the tape width and length, the tape material, information relevant to a record of using recorded data in each partition, user information, and the like, which are described below. The various types of information stored in the remote memory chip 4 are used for management of writing/reading to/from the magnetic tape 3. Accordingly, these types of information are collectively called management information.

As described above, by providing a tape cassette housing with a nonvolatile memory, storing management information in the nonvolatile memory, providing an interface for writing/reading to/from the nonvolatile memory to a tape streamer drive adapted for the tape cassette, and writing and reading management information concerning data writing to and data reading from the nonvolatile memory, the operations of writing to and reading from the magnetic tape 3 can be efficiently performed.

By way of example, in the loading/unloading mode it is not necessary to rewind the magnetic tape back to the tape beginning. In other words, loading and unloading can be performed even in the middle of the tape. Data editing and the like can be executed by rewriting the management information in the nonvolatile memory. On the tape a large number of partitions can be formed and appropriately managed.

Figure 3B:
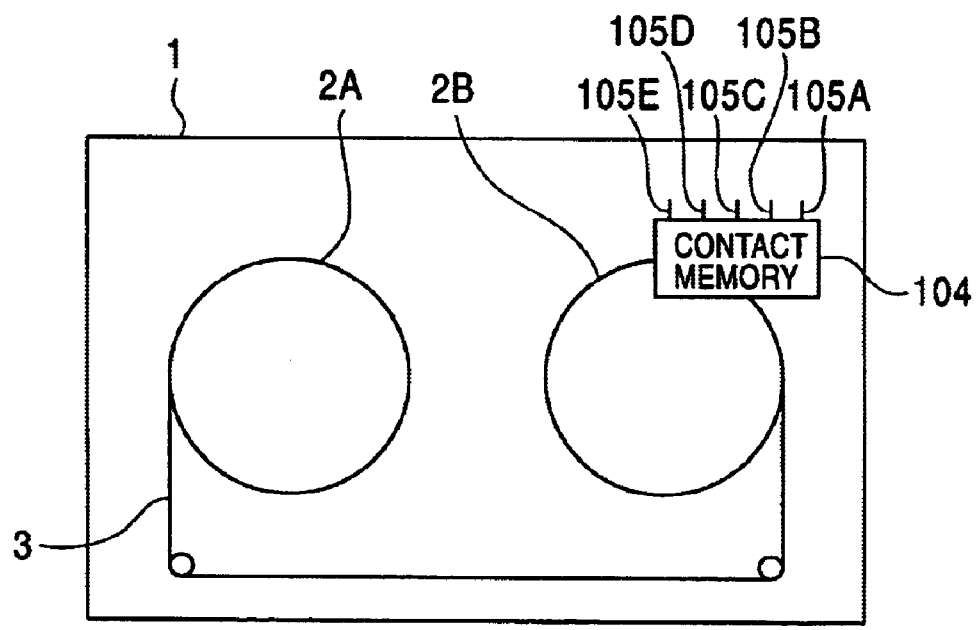

FIG. 3B shows a tape cassette 1 having a built-in contact memory forming a nonvolatile memory 104 in which five terminals 105A, 105B, 105C, 105D, and 105E extend from the contact memory 104 as a module. These terminals can be used as a power-supply terminal, a data-input terminal, a clock-input terminal, a ground terminal, and a spare terminal respectively. Data in the contact memory 104 is management information similar to that in the remote memory chip 4.

In the following description, the term memory-in-cassette (MIC) memory is used to describe both the remote memory chip 4 and the contact memory 104.

Figure 4:
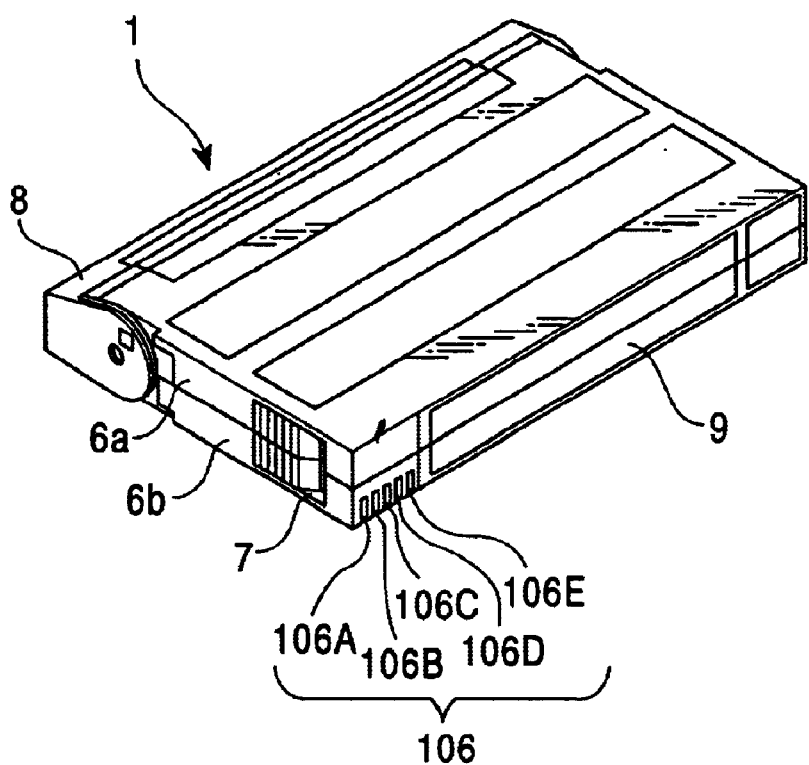
FIG. 4 is a perspective view showing the exterior of a tape cassette according to an embodiment of the present invention.

FIG. 4 shows the exterior of the tape cassette 1 shown in FIG. 3A or 3B, in which the entire housing consists of an upper case 6a, a lower case 6b, and a lid or guard panel 8 and is basically similar to the structure of a tape cassette for use in an ordinary 8-mm videocassette recorder.

In the vicinity of a label surface on one side of the tape cassette 1, a terminal part 106 is provided. Terminal part 106 is a region where electrode terminals of the tape cassette 1 including the contact memory 104, that is, terminal pins 106A, 106B, 106C, 106D, and 106E are provided. These terminal pins are respectively connected to the terminals 105A, 105B, 105C, 105D, and 105E shown in FIG. 3B. In other words, the tape cassette 1 including the contact memory 104 is brought into physical and electrical contact with the tape streamer drive via the terminal pins 106A, 106B, 106C, 106D, and 106E, whereby a data signal is transmitted back and forth.

Although in a tape cassette including the remote memory chip 4 of the noncontact type as in FIG. 3A, the need for using terminal pins is naturally eliminated, the tape cassette nevertheless has a common exterior as shown in FIG. 4 and is provided with a dummy terminal part for maintaining tape-cassette-shape compatibility with the tape streamer drive.

Also, a label-form noncontact remote memory chip, not shown, is known. In this type a label on which a remote memory chip is formed is pasted in a predetermined position on the housing of the tape cassette 1. With this structure, when the tape cassette 1 is loaded into the tape streamer drive 10, the remote memory chip and the memory driver of the tape streamer drive can perform communication with each other.

Structure of the Remote Memory Chip

Figure 5:
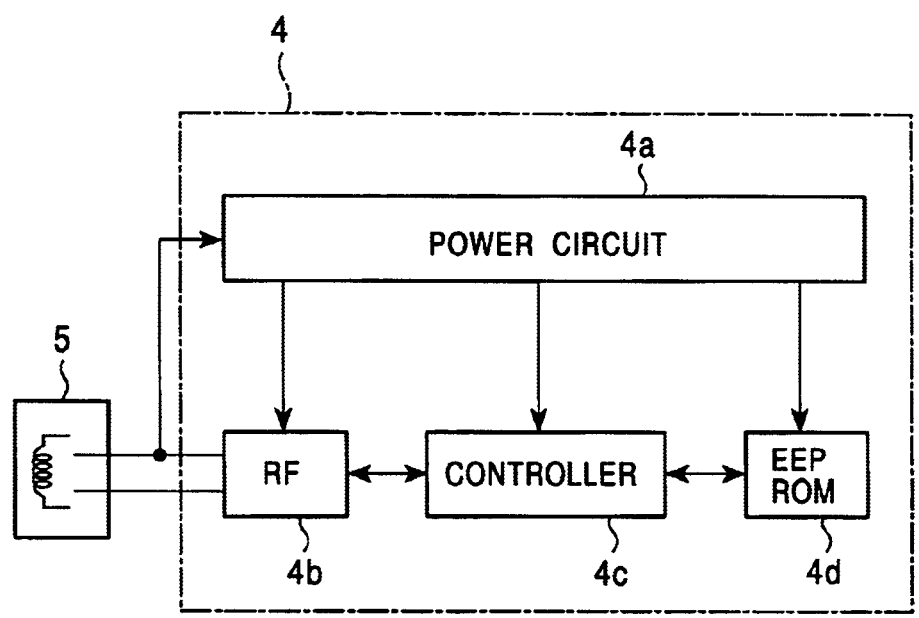
FIG. 5 is a block diagram of a remote memory chip provided in a tape cassette according to an embodiment of the present invention.

The circuit structure of the remote memory chip 4 is shown in FIG. 5 and the remote memory chip 4 includes, as a semiconductor integrated circuit (IC), a power circuit 4a, an RF processor 4b, a controller 4c, and an electrically erasable, programmable read-only memory (EEPROM) 4d. Upon mounting the remote memory chip 4 of this type on a fixed printed circuit board in the tape cassette 1, the copper-foil portion on the printed circuit board forms an antenna 5.

The remote memory chip 4 is externally supplied with electric power without requiring actual contact. The remote memory chip 4 uses 13-MHZ-band carrier waves to perform communication with the tape streamer drive 10. When the remote memory chip 4 receives radio waves from the tape streamer drive 10, the power circuit 4a converts the 13-MHZ-band carrier waves into direct-current electric power. The power circuit 4a uses the direct-current electric power as an operational power supply and supplies electric power to the RF processor 4b, the controller 4c, and the EEPROM 4d.

The RF processor 4b demodulates received information and modulates information to be transmitted. The controller 4c controls execution of decoding a received signal from the RF processor 4b, execution of a process in accordance with the decoded information, such as the processes of writing to and reading from the EEPROM 4d.

In other words, the remote memory chip 4 is activated by receiving radio carrier waves from the tape streamer drive 10, and the controller 4c manages data in the EEPROM 4d as a nonvolatile memory by executing process instructions based on commands superimposed on the carrier waves.

Structure of the Tape Streamer Drive

Figure 1:
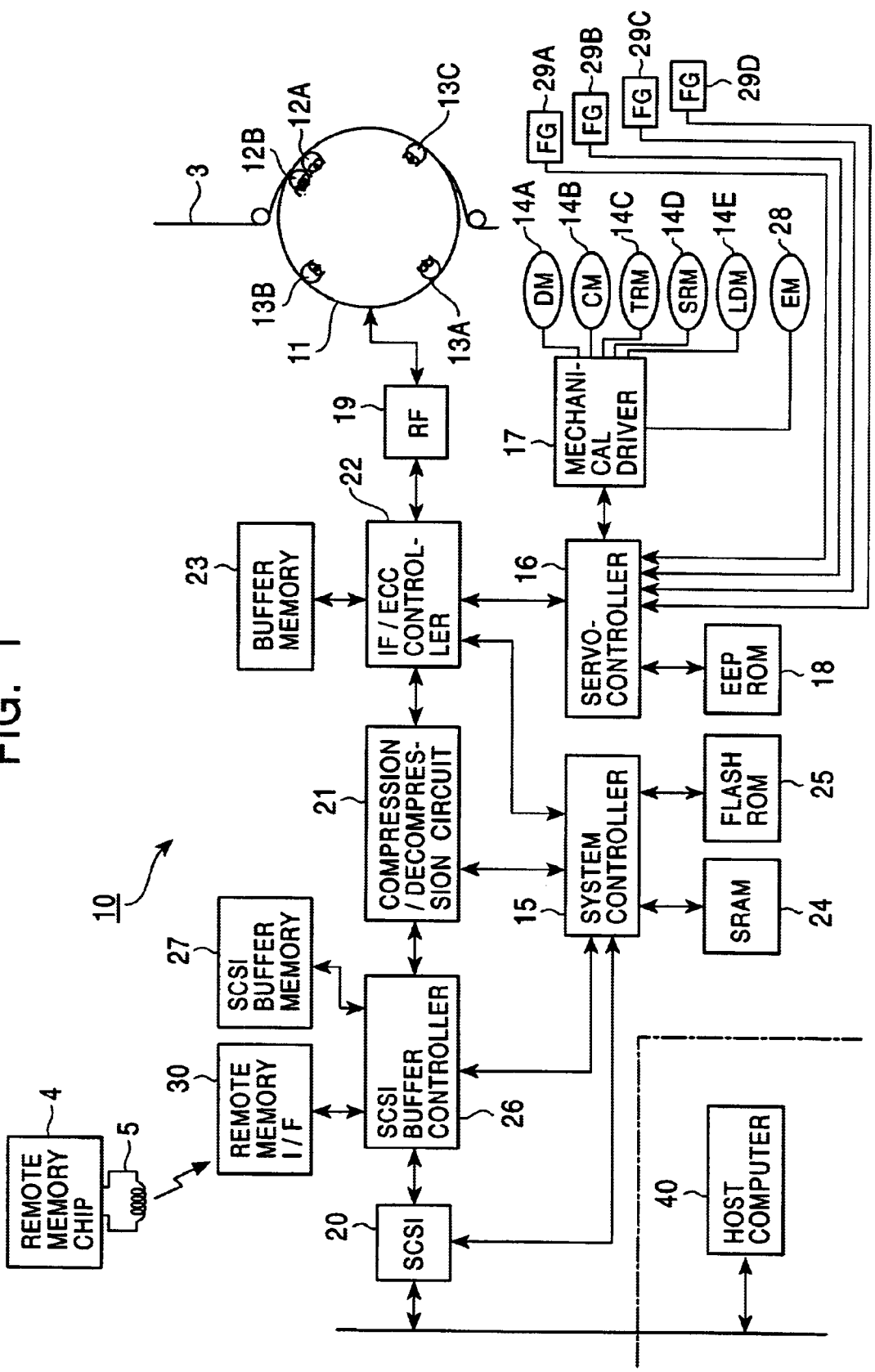
FIG. 1 is a block diagram of a tape streamer drive according to an embodiment of the present invention, which is adapted for a remote memory chip.

With reference to FIG. 1, the tape streamer drive 10 adapted for the tape cassette 1 including the remote memory chip 4 is described, in which the tape streamer drive 10 uses helical scanning to perform writing to or reading from the magnetic tape 3 in the tape cassette. In FIG. 1, a rotary drum 11 is provided with two write heads 12A and 12B and three read heads 13A, 13B, and 13C. The write heads 12A and 12B are formed so that heads having gaps with different azimuth angles are adjacent to each other. The read heads 13A, 13B, and 13C are also provided having predetermined azimuth angles.

The rotary drum 11 is rotated by a drum motor 14A and the magnetic tape 3, which is pulled from the tape cassette, not shown in FIG. 1, is wound around a partial circumference of the rotary drum 11. The magnetic tape 3 is driven by a capstan motor 14B and a pinch roller, not shown. The magnetic tape 3 is wound around the reels of the cassette, as described above, and the reels are rotated in the forward direction and in the reverse direction.

A loading motor 14E drives a loading mechanism, not shown, to execute the loading/unloading of the magnetic tape 3 onto the rotary drum 11. An eject motor 28 is used for driving a mechanism for loading the tape cassette, the mounting of the loaded tape cassette, and an operation of ejecting a loaded tape cassette. The drum motor 14A, the capstan motor 14B, the reel motors 14C and 14D, the loading motor 14E, and the eject motor 28 are driven to rotate when being supplied power from a mechanical driver 17. The mechanical driver 17 is controlled by a servocontroller 16, so as to properly drive each motor. The servocontroller 16 controls the rotational speed of each motor, thereby executing tape running in the normal writing and reading modes, tape running in the high-speed reading mode, and tape running in the fast-forwarding and rewinding modes. The EEPROM 18 stores constants, which are used by the servocontroller 16 to perform servocontrol of each motor.

In order that the servocontroller 16 may execute servocontrol of each motor, each of the drum motor 14A, the capstan motor 14B, the take-up reel motor 14C, and the supply reel motor 14D includes a frequency generator (FG) so as to produce rotation information for each motor. In other words, the system includes a drum FG 29A for generating frequency pulses synchronized with the rotation of the drum motor 14A, a capstan FG 29B for generating frequency pulses synchronized with the rotation of the capstan motor 14B, a take-up reel FG 29C for generating frequency pulses synchronized with the rotation of the take-up reel motor 14C, and a supply reel FG 29D for generating frequency pulses synchronized with the rotation of the supply reel motor 14D. Outputs in the form of FG pulses from the FGs are supplied to the servocontroller 16.

The servocontroller 16 detects an error between the rotation of each motor and the object rotational speed by detecting the rotation speed of each motor based on the respective FG pulses and, based on the amount of the error, controls the power applied to the mechanical driver 17, whereby closed-loop rotational speed control is realized. Accordingly, in various operations such as normal tape running in the writing/reading mode, high speed search, fast forwarding, and rewinding, the servocontroller 16 can control each motor to rotate based on the target rotational speed adapted for each operation.

The servocontroller 16 is bidirectionally connected to a system controller 15 for executing a process of controlling the entire system via an interface controller/ECC formatter, hereinafter referred to as an IF/ECC controller 22.

In the tape streamer drive 10, an SCSI interface 20 is used. By way of example, in the data writing mode, sequential data input in data transmission units called fixed-length records from a host computer 40 via the SCSI interface 20 are supplied to a compression/decompression circuit 21 via an SCSI buffer controller 26. The SCSI buffer controller 26 controls the data transfer of the SCSI interface 20. An SCSI buffer memory 27 is a buffer unit adapted for the SCSI buffer controller 26, so that the transfer speed of the SCSI interface 20 can be obtained. The SCSI buffer controller 26 also supplies predetermined command data to a remote memory interface 30 and generates an operation clock signal for the remote memory interface 30.

In this tape streamer drive system, there is a mode in which data are transmitted from the host computer 40 in units of variable length data groups. The compression/decompression circuit 21 uses a predetermined method to perform a compressing process on the input data, as required. When compression using LZ codes, first expounded by J. Ziv and A. Lempel, is employed, the compression circuit 21 assigns a dedicated code to each previously processed character string and stores the codes in the form of a dictionary. Subsequently, input character strings are compared with the contents of the dictionary. If a character string of the input data coincides with a code of the dictionary, the character string is replaced by the dictionary code. If a character string of the input data does not coincide with a code of the dictionary, a new code is assigned each time to the character string, and the code is recorded in the dictionary. As described above, by recording input character-string data in a dictionary, and replacing the string data with dictionary codes, data compression is performed.

An output from the compression/decompression circuit 21 is supplied to the IF/ECC controller 22 that performs a control operation to temporarily store the output of the compression/decompression circuit 21 in the buffer memory 23. Under control of the IF/ECC controller 22, the data stored in the buffer memory 23 are finally processed using fixed-length units called groups, each of which corresponds to forty magnetic tape tracks, and ECC format processing on the data is performed.

The ECC format processing is performed by adding error-correcting codes to write data, performing modulation processing on the data so as to be adapted for magnetic recording, and supplying the processed data to an RF processor 19. The RF processor 19 generates a write signal by performing processes, such as amplification and recording equalizing, on the write data and supplies the processed data to the write heads 12A and 12B for data writing to the magnetic tape 3.

In regard to a data reading operation, the data written on the magnetic tape 3 are read as an RF read signal by the read heads 13A and 13B, and the RF processor 19 performs processes on the read output, such as read-equalizing, read-clock generation, binarization, and decoding, such as Viterbi decoding.

The signal read as described above is initially processed for error correction in the IF/ECC controller 22. The error-corrected signal is temporarily stored and is read at a predetermined point of time and supplied to the compression/decompression circuit 21.

Based on a determination by the system controller 15, the compression/decompression circuit 21 performs data decompression when the supplied data are compressed, while the compression/decompression circuit 21 simply outputs the data without performing data decompression when the supplied data are not compressed. The output data from the compression/decompression circuit 21 is fed as read data over a bus to the host computer 40 via the SCSI buffer controller 26 and the SCSI interface 20.

In FIG. 3A, the remote memory chip 4 in the tape cassette 1 is shown. The tape cassette 1 is loaded into the tape streamer drive, 10 of FIG. 1, whereby the remote memory chip 4 is set to be in condition capable of performing data input/output with the system controller 15 via the remote memory interface 30 without being in contact therewith.

Figure 2:
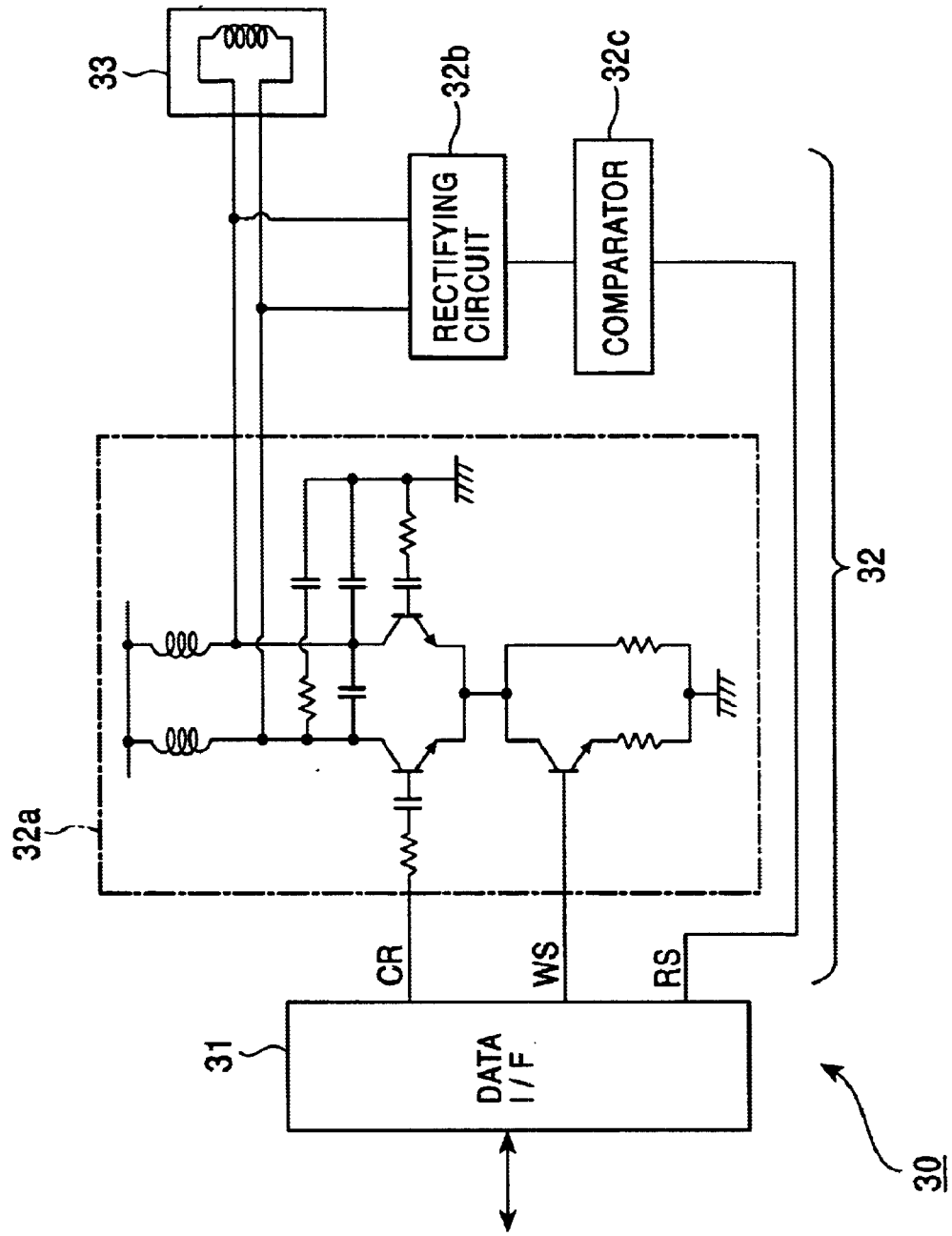
FIG. 2 is a block diagram of a remote memory interface provided in a tape streamer drive according to an embodiment of the present invention.

The structure of the remote memory interface 30 is shown in FIG. 2, in which a data interface (I/F) 31 performs data exchange with the system controller 15. Data transfer to the remote memory chip 4 is performed when a command is sent from the apparatus and the remote memory chip 4 acknowledges the command. When the system controller 15 issues a command to the remote memory chip 4, the data I/F 31 receives a clock signal and command data from the SCSI buffer controller 26. Based on the clock signal, the data I/F 31 supplies the command data to the RF interface 32 and, more specifically, the data I/F 31 supplies a carrier frequency CR (13 MHZ) signal to the RF interface 32.

In the RF interface 32 of FIG. 2, an RF-modulation/amplification circuit 32a performs amplitude modulation at 100 kHz on command data WS from the data I/F311, superposes the modulated command on the carrier signal CR, amplifies the modulated signal, and supplies it to the antenna 33.

The RF-modulation/amplification circuit 32a transmits the command data by radio waves from the antenna 33 to the antenna 5 in the tape cassette 1 shown in FIG. 3A. The tape cassette 1 is activated by receiving the command data from the antenna 5, in accordance with the structure shown in FIG. 5, in which a controller 4c operates in accordance with a command-instructed content, so that data transmitted with a write command are written in an EEPROM 4d.

When a command is issued from the remote memory I/F 30, the remote memory chip 4 issues an acknowledgment corresponding to the command. In other words, the controller 4c in the remote memory chip 4 modulates and amplifies data in the RF processor 4b as an acknowledgment, and transmits it as an output from the antenna 5.

In the case where the transmitted acknowledgment is received by the antenna 33 of the remote memory I/F 30 of FIG. 2, the received signal is rectified by a rectifying circuit 32b in the RF interface 32, and the rectified signal is demodulated as data by a comparator 32c. The demodulated signal is supplied from the data I/F 31 to the system controller 15. When a read command is issued from the system controller 15 to the remote memory chip 4, for example, the remote memory chip 4 transmits data read from the EEPROM 4d, together with a code as a corresponding acknowledgment. At this time, the acknowledgment code and the read data are received and demodulated by the remote memory I/F 30 and then supplied to the system controller 15.

The tape streamer drive 10 is provided with the remote memory I/F 30, as described above, whereby the tape streamer drive 10 can access the remote memory chip 4 in the tape cassette 1 and, in the above-described noncontact data exchange, data are superposed on 13-MHZ-band carrier waves by performing 100-kHz amplitude modulation.

The original data are processed into packets. In other words, by adding a header, parity bits, and other necessary information to a command and data as an acknowledgment, so that packets are formed, and performing modulation after performing code conversion on the packets, the modulated signal can be transmitted and received as a stable RF signal.

A technique for realizing the above-described noncontact interface has been introduced as a technique earlier filed and registered as Japanese Patent No. 2550931 by the present Applicant.

Referring to FIG. 1, in the S-RAM 24 and the flash ROM 25, data used for various processes by the system controller 15 are stored. The flash ROM 25 stores constants and the like for control. The S-RAM 24 is used as a work memory and as a memory for storing data read from the remote memory chip 4, data to be written in the remote memory chip 4, mode data set for each tape cassette unit, and various-flag data and also for computation. The S-RAM 24 and the flash ROM 25 may be formed as an internal memory of a microcomputer constituting the system controller 15. Also, part of the areas of the buffer memory 23 may be used as a work memory.

Between the tape streamer drive 10 and the host computer 40, mutual transmission of information is performed using the SCSI interface 20, and the host computer 40 uses SCSI commands to perform various types of communication with the system controller 15.

In a structure adapted for the tape cassette 1 shown in FIG. 3B including the contact memory 104, a predetermined connector part, not shown, is provided in order to write/read data to/from the contact memory 104. The connector part is formed so as be adapted for the terminal part 106 shown in FIG. 4. By connecting the connector part to the terminal part 106, the five terminals of the contact memory, 105A, 105B, 105C, 105D, and 105E are electrically connected to the system controller 15. This enables the system controller 15 to directly access the contact memory 104 of the loaded tape cassette 1.

Structure of Data on the Magnetic Tape

The format of data on the magnetic tape 3 in the tape cassette 1 on which writing/reading is performed by the above-described tape streamer drive 1 is described below, and FIG. 6 shows the structure of data recorded on the magnetic tape 3. In FIG. 6, schematic illustration (a) shows the magnetic tape 3, in which the magnetic tape 3 is divided in units called partitions. In the system of this embodiment, a maximum of 256 partitions can be set and managed. The partitions shown in illustration (a) are supplied with partition numbers as indicated by partitions #0, #1, #2, #3.

Therefore, in this embodiment, data writing/reading can be separately performed for each partition. For example, the data writing unit in one partition, shown in FIG. 6, illustration (b), can be divided into fixed-length units which are each called a group, shown in FIG. 6, illustration (c), and writing on the magnetic tape 3 is performed for each group.

In this case, one group corresponds to a data amount of twenty frames, and one frame is formed by two tracks, as shown in FIG. 6 illustration (d). In this case, the two tracks forming one frame are adjacent positive-azimuth and negative-azimuth tracks. Accordingly, one group is formed by 40 tracks.

Figure 7A:
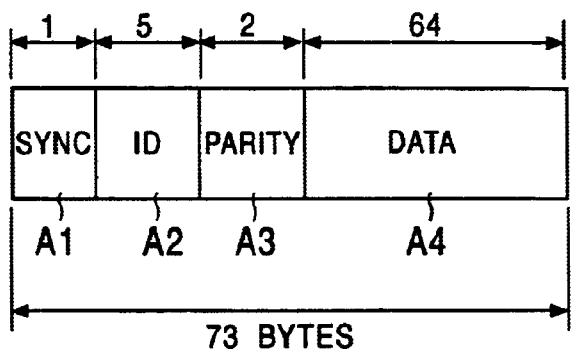
FIGS. 7A, 7B, and 7C are illustrations of a track structure on a magnetic tape in a tape cassette according to an embodiment of the present invention.
Figure 7B:
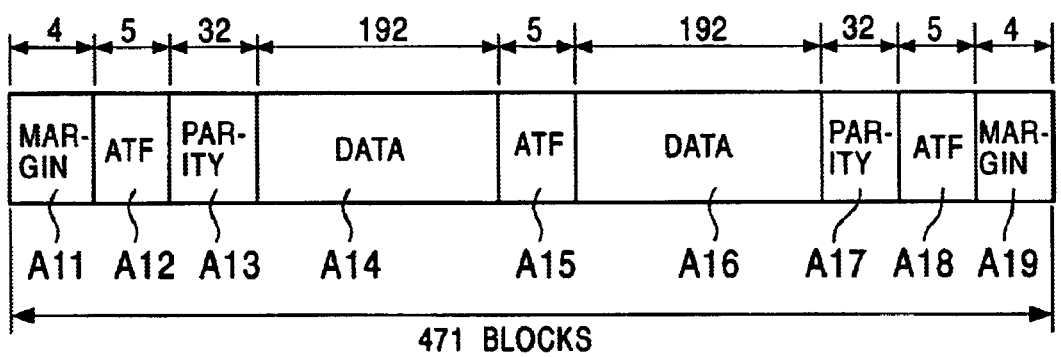

The structure of data in one track in the frame shown in FIG. 6 illustration (d) is shown in FIGS. 7A and 7B. In FIG. 7A, the structure of block unit data is shown, in which one block is formed by a 1-byte SYNC data area A1, a 6-byte D area A2 for search, an error-correcting parity area A3 comprised of 2 bytes, and a 64-byte data area A4.

In this embodiment, when writing is performed using the tape cassette 1, whose use is described as write once read many or WORM, a cartridge serial number stored in the remote memory chip 4 as identification information of the tape cassette 1 is written in the data area A1, together with write data. This makes it possible to establish correspondence between the remote memory chip 4 and the magnetic tape 3 in the tape cassette 1.

The one-track data shown in FIG. 7B is formed by a total of 471 blocks. In one track, 4-block margin areas A11 and A19 are provided at its ends, and ATF or automatic tracking areas A12 and A18 for tracking control are respectively provided after the margin area A11 and before the margin A19. After the AFT area A12 and before the ATF-area A18, parity areas A13 and A17 are provided. A 32-block region is assigned to the parity area A13 or A17.

In addition, an ATF area A15 is provided in the center of one track, and a 5-block region is assigned to each of the AFT areas A12, A15, and A18. Between the parity area A13 and the ATF area A15, and between the ATF area A15 and the parity area A17, two 192-block data areas A14 and A16 are respectively provided. Hence, all the data areas A14 and A16, in one track occupy 384 blocks among all the 471 blocks.

Figure 7C:
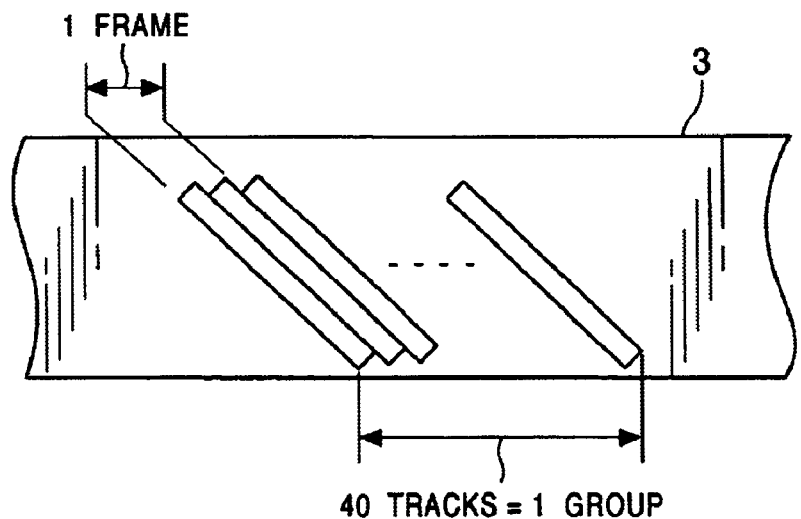

The tracks are physically written on the magnetic tape 3, as shown in FIG. 7C, so that 40 tracks constitute one group, as described above.

Figure 8:
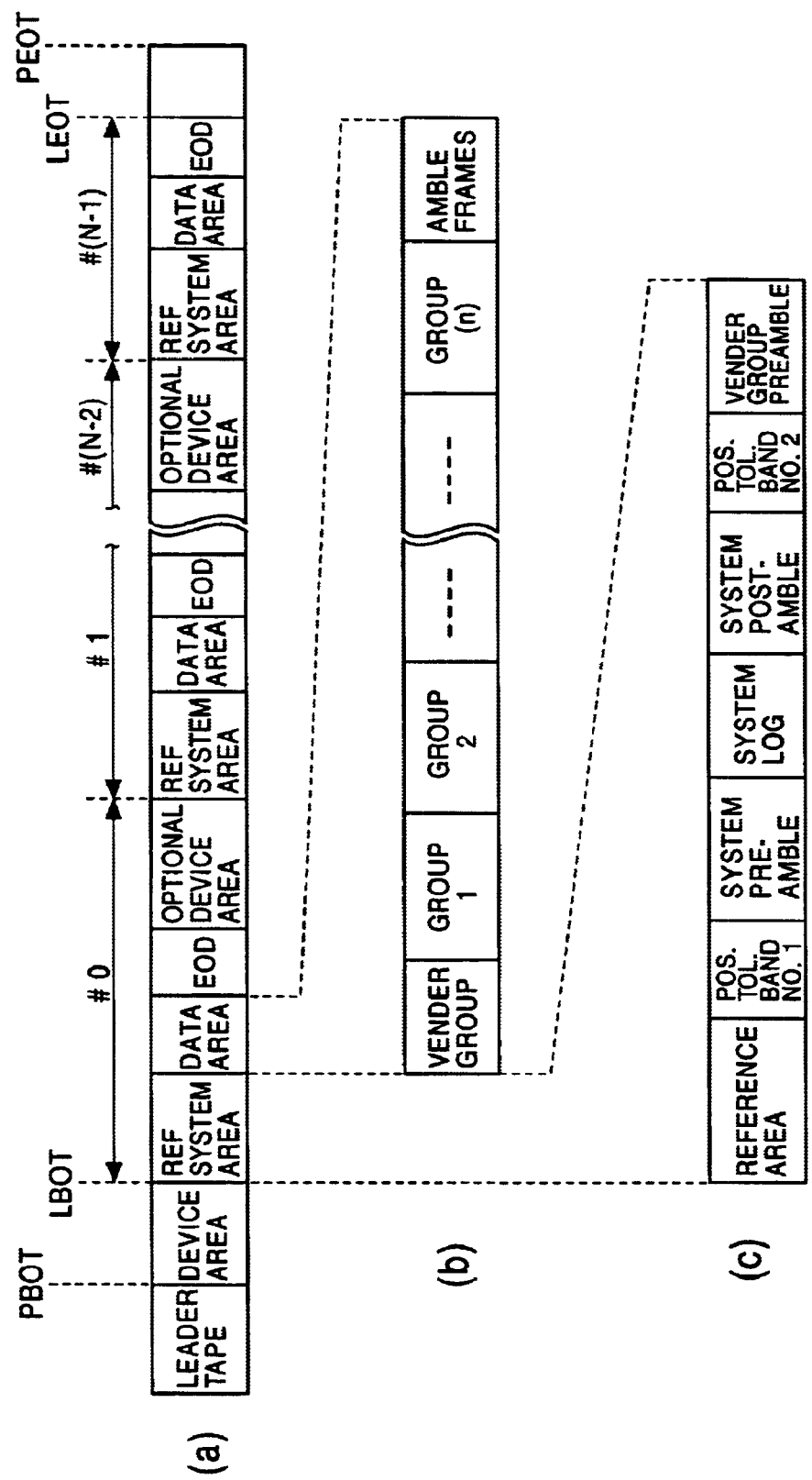
FIG. 8 consists of illustrations of an area structure on a magnetic tape in a tape cassette according to an embodiment of the present invention.

The area structure shown in FIG. 8 is used to write data on the magnetic tape 3 in the format described in relation to FIGS. 6 and 7A to 7C, in which FIG. 8 N partitions from #0 to #N-1 are formed, and leader tape is physically positioned at the start of the magnetic tape 3, as shown in illustration (a), and a device area that is a region for performing tape-cassette loading/unloading is subsequently provided. The start of the device area is used as a physical beginning of tape, PBOT.

Following the device area, a reference system area relating to partition #0 is provided in which tape-use-record information and the like are stored are provided and a data area is next provided. The start of the reference system area is used as a logical beginning of tape or LBOT.

In the reference system area, a reference area, a position tolerance band No. 1, a system preamble, a system log, a system postamble, a position tolerance band No. 2, and a vendor group preamble are formed, as shown enlarged in FIG. 8 illustration (c).

In the data area following the reference system area, a vendor group representing information on a vendor to which data are initially created and supplied is provided, as shown enlarged in FIG. 8 illustration (b). Next a sequence of groups, each of which is as shown in FIG. 6 illustration (c), are formed, as indicated by group 1 to group (n), and amble frames are provided after the end group (n). After the data area, an end of data or EOD region representing the end of the data area in a partition is provided, as shown in FIG. 8 in illustration (a).

When only one partition is formed, the end of the EOD of the partition #0 is used as a tape's logical end of tape or LEOT, however, in this embodiment N partitions are formed. Accordingly, an optional device area is formed subsequently to the EOD of partition #0.

The device area following the start position PBOT is an area for performing loading/unloading corresponding to partition #0, and the optional device area at the end of partition #0 is an area for performing loading/unloading corresponding to partition #1. In this embodiment, based on unloading-position information, an arbitrary device area or optional device area as an unloading area can be selected, as described below. In other words, unloading at the desired position can be performed.

Concerning partition #1, areas are formed similarly to the case of partition #0, and at the end of partition #1 an optional device area is formed that is an area for performing loading/ unloading corresponding to the next partition #2. Thereafter, partitions up to #(N-1) are similarly formed. In the last partition #(N-1), an optional device area is not formed since it is not necessary, and the end of the EOD of partition #(N-1) is used as the logical end position or LEOT. A physical end of tape or PEOT represents the tape's physical end position or a physical partition's end position.

ID Area

Figure 9:
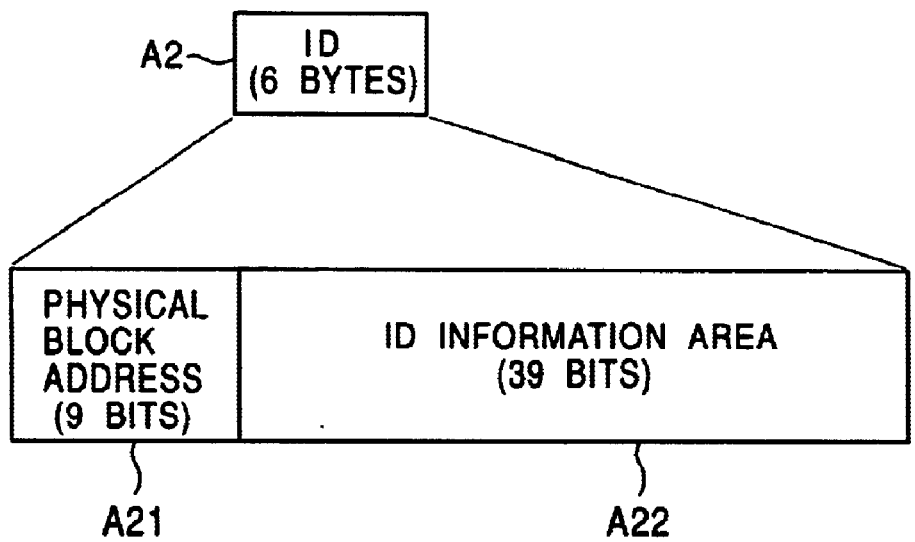
FIG. 9 is a drawing illustrating an ID area on a magnetic tape in a tape cassette according to an embodiment of the present invention.
Figure 10:
FIG. 10 is a drawing illustrating physical block addresses in an ID area in a tape cassette according to an embodiment of the present invention.

The ID area A2 shown in FIG. 7A is described below with reference to FIGS. 9 to 11, and FIG. 9 shows the data structure of the ID area A2. The ID area A2 consists of a 9-bit physical block address A21 followed by a 39-bit ID information area A22. Because all the data areas, A1 and A16, in one track make up 384 blocks, as described above, the number of physical block addresses A21 included in all the data areas is also 384.

As schematically shown in FIG. 10, address values are given to the 384 physical block addresses A21 in order from the physical block address A21 at the start of one track, so as to be incremented from 0 to 383.

This enables the writing/reading apparatus to appropriately treat the information of the ID information area A22 included in the data area in one track. The data size of the ID information area A22 included in the data area in one track is 1872 bytes, which is found as follows: 39 (bits)×384 (blocks)=14976 (bits)=1872 (bytes).

FIG. 11 shows the types of information stored in the ID information area A22 shown in FIG. 9. The types of information are stored so as to correspond to the ID information areas A22, having a total of 1872 bytes, included in the data area on one track. In addition, considering that the tape streamer drive 10 is enabled to securely read the ID area information, the same type of ID area information is written for each track a plural number of times in accordance with a predetermined rule.

In FIG. 11, a raw format ID having 16 bits represents a basic format type relating to a magnetic tape. In this embodiment, it represents information such as a track pitch, the data size of one frame, the number of blocks included in one track, the data size of one block, tape length, tape thickness, and tape material. A logical format ID formed of 8 bits represents the type of write format that is actually used.

A Logical frame ID formed of 8 bits consists of last frame ID, ECC frame ID, and logical frame number. The last frame ID has one bit and indicates whether the present frame including the ID area is the last frame in a group. The ECC frame ID has one bit and indicates whether write data in the data areas in the present frame are used as error-correcting codes. As described above, one group consists of 20 frames. The logical frame number is formed of six bits and represents the order of the frame in the present group.

A Partition ID has 16 bits and represents the partition number of the partition including the present frame. An Area ID has 4 bits and indicates to which area the frame belongs, a Data ID has 4 bits and represents the type of data processing form based on the write format, an N-position has 4 bits, and an N-repeat of 4 bits define information for a multiwrite mode.

A Group count has 24 bits and represents the total number of groups up to the group including the frame in the present partition. A File-mark count has 32 bits and represents the total number of file marks included from the start position of the present partition to the present group. Each file mark is information representing a data file separation in one partition.

A Save-set mark count has 32 bits and represents the total number of file marks included from the start position of the partition up to the present group. The save-set mark count has 32 bits and is information representing separations at data-save positions in one partition.

A Record count has 32 bits and represents a total of records from the start position of the present partition up to the present group. An Absolute frame count has 24 bits and represents the total number of frames from the start of the present partition up to the present group. In preparation for a future addition of ED area information an undefined or reserved area is provided.

The definitions of the ID area information and the bits assigned to the ID area information, shown in FIG. 11, are examples and may be changed in accordance with actual operation conditions.

Data Structure in the Remote Memory Chip

Figure 12:
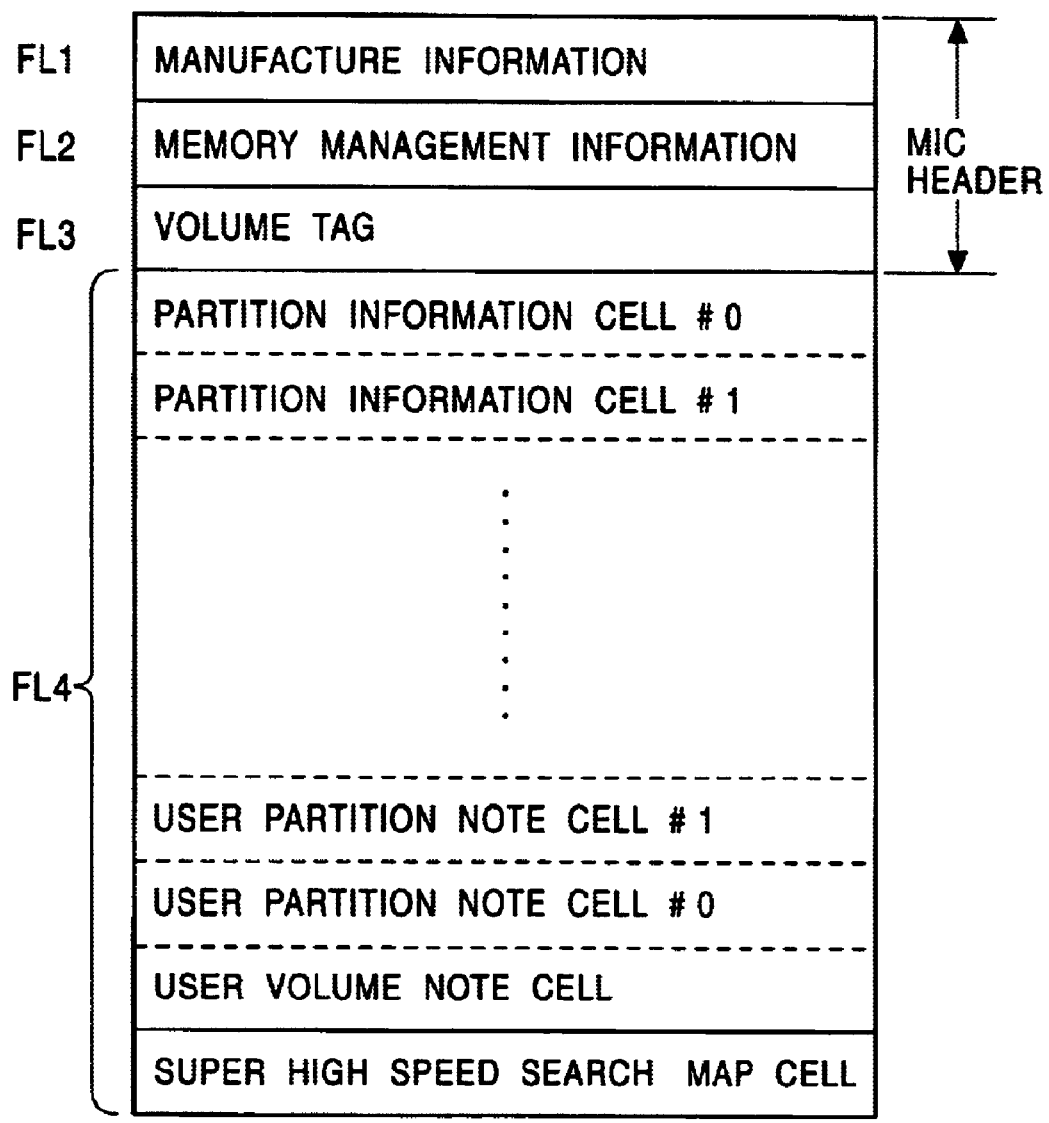
FIG. 12 is an illustration of memory in cassette (MIC) data structure in an embodiment of the present invention.

The structure of data in the remote memory chip 4 or in the contact memory 104 or MIC included in the tape cassette 1 of FIGS. 3A and 3B is described below, in which FIG. 12 is a schematic showing of the structure of data stored in the MIC. Fields FL1 to FL4 are provided as the storage areas of the MIC, as shown in FIG. 12, and in fields FL1 to FL4, various types of information obtained when the tape cassette 1 was manufactured, tape information at the time of initialization, information for each partition, and the like are written. Field FL1 is called manufacture information and is used as a manufacture area in which mainly various types of information obtained when the tape cassette 1 was manufactured are stored. Field FL2 is called memory management information and is used as a drive-initialize area in which mainly information at the time of initialization is stored. Field FL3 is called a volume tag and basic management information of the entire tape cassette is stored in field FL3. Field FL4 is used as the area of a memory free pool in which additional management information can be stored. In the memory free pool, a process of writing and reading operations, and various types of other information if required, are stored. One data group unit stored in the memory free pool is called a cell.

At first, in accordance with partitions formed on the magnetic tape 3, partition information cells #0, #1 , . . . , which are used as management information for the partitions, are sequentially written from the beginning of the memory free pool. In other words, there are as many partition information cells as partitions formed on the magnetic tape 3.

At the end of the memory free pool, a super high-speed search map cell is written as map information for performing a high-speed search. Just before that a user volume note cell and user partition note cells are subsequently written. The user volume note cell is information such as a user-input comment for the entire tape cassette, and each user partition note cell includes information, such as a user-input comment for each partition.

Accordingly, these types of information are stored when the user instructs writing. Not all of these types of information are always provided. Any intermediate area in which these types of information are not stored is left as a memory free pool for subsequent writing.

Figure 13:
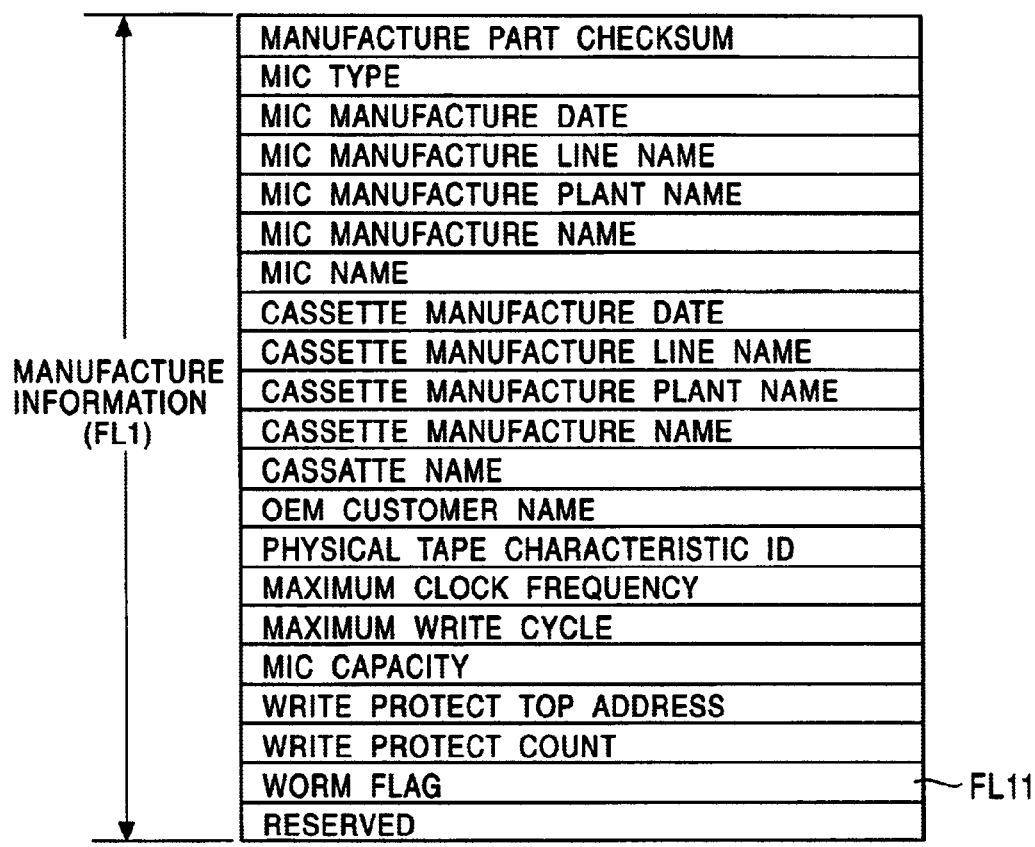
FIG. 13 is an illustration of MIC manufacture information in an embodiment of the present invention.

The manufacture information in field FL1 has an arrangement such as shown in FIG. 13, in which checksum information for the data of the manufacture information is stored as a manufacture part checksum at the beginning. The manufacture part checksum information is provided at the time the tape cassette is manufactured. MIC type information to the write protect byte count information describe actual data constituting the manufacture part. The reserved area is reserved for future data storage. More specifically, the MIC type is data representing the type of MIC that is actually included in the tape cassette. The MIC manufacture date represents the manufacturing date and time of the NBC. The MIC manufacture line name represents information of a production line that manufactured the MIC. The MIC manufacture plant name represents information of the name of the plant that manufactured the MIC. The MIC manufacturer name represents information of the name of the manufacturer that manufactured the MIC. The MIC name represents information of the vendor of the MIC.

In addition, the cassette manufacture date, the cassette manufacture line name, the cassette manufacture plant name, the cassette manufacture name, and the cassette name, information on the cassette itself, which is similar to the information on the MIC, is described.

Information of the name of an original equipment manufacturer customer is stored in the OEM customer name area. The Physical tape characteristic ID represents information on physical characteristics of the magnetic tape 3, such as tape material, tape thickness, and tape length. Information representing a maximum clock frequency for the MIC is stored in the maximum clock frequency area. The Maximum write cycle represents information on how many bytes of data at a time the MIC can transfer to the tape streamer drive 10 when performing communication. This information relates to data block size and is dependent on the physical characteristics of the nonvolatile memory used as the MIC. The MIC capacity represents information of the storage capacity of the MIC. The Write protect top address is used to prohibit writing to a predetermined partial area of the MIC and represents the start address of the write-prohibited area. The Write protect count represents the number of bytes of the write-prohibited area. In other words, an area occupied by the number of bytes represented by the write protect count from the address designated by the write protect top address, is set as the write-prohibited area. The WORM flag in field FL11 indicates WORM as use-recognition information. The WORM flag is described below with reference to FIG. 21.

Figure 14:
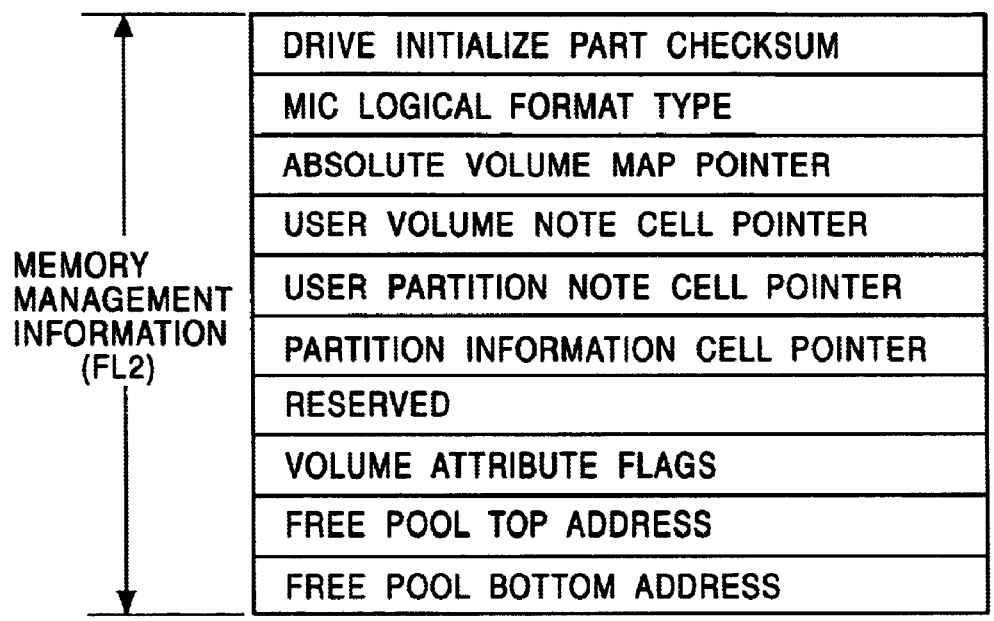
FIG. 14 is an illustration of MIC memory management information in an embodiment of the present invention.

The arrangement of the memory management information in field FL2 in FIG. 12 is described with reference to FIG. 14, in which checksum information for the data of the memory management information as a drive initialize part is initially stored as a drive initialize part checksum.

Information about the MIC logical format type to the free pool bottom address are described in the following by the actual data constituting the memory management information. The ID number of an MIC logical format is stored in the MIC logical format type area and, concerning the MIC format, in addition to a basic MIC format, there are various formats relating to a firmware updating tape MIC format, a reference MIC format, a cleaning cassette MIC format, and the like. A pointer representing the start address of the super high-speed search map cell shown in FIG. 12 is set in an absolute volume map pointer area. The User volume note cell pointer represents the start address of a storage area enabling the user to freely perform reading/writing from/to the tape cassette via the SCSI interface, that is, the user volume note cell shown in FIG. 12. The User partition note cell pointer represents the start address of a storage area enabling the user to freely perform reading/writing of data from/to each partition via the SCSI interface, that is, the user partition note cell shown in FIG. 12. In the case where a plurality of user partition note cells are stored, the user partition note cell pointer represents the start address of a start cell among the plurality of user partition note cells. The Partition information cell pointer represents the start address of the partition information cell #0 shown in FIG. 12.

There are as many pieces of partition information written in the memory free pool as the number of partitions formed on the magnetic tape 3. All partition information cells #0 to #N are linked by pointers in a link structure. In other words, the partition information cell pointer is used as a root representing the address of partition #0, and the pointers of the subsequent partition information cells are set in the adjacent partition information cells.

As described above, the data positions in field FL4 are managed by the pointers including the absolute volume map pointer, the user volume note cell pointer, the user partition note cell pointer, and the partition information cell pointer.

Volume attribute flags are used to provide the MIC with a logical writing-prohibition tag. In other words, the MIC header flag represents writing permission/prohibition in the manufacture part or writing permission/prohibition in a part excluding the manufacture part. The Free pool top address and the free pool bottom address represent, respectively, the current start address and end address of the memory free pool in field FL2. Since the memory free pool area changes in accordance with the writing or erasure of the partition information or the user partition note, the free pool top address or the free pool bottom address is updated accordingly.

The structure of the volume tag in field FL3 in FIG. 12 is described with reference to FIG. 15, in which checksum information of the data of volume information, which has basic management information on the entire tape cassette, is stored in volume information checksum. Volume information is also provided. Checksum information of the data of an accumulative partition information, which has record information from the time the tape cassette was manufactured, is stored in the accumulative partition information checksum area. Accumulative partition information is also provided. After the volume note checksum and the volume note, a serial number that is ASCII-based 32-character information is stored as a cartridge serial number, and the code number of the manufacturer of the tape cassette 1, which is a manufacture identifier, is stored as manufacturer ID.

The Secondary ID is a secondary identifier in accordance with the type of the tape cassette 1, for example, tape attribute information as a code value is stored as the secondary ID. The Cartridge serial number part checksum is used as checksum information for the cartridge serial number, the manufacture ID, and the secondary ID. The areas of specific volume tags 1 to 13 are provided as a reserve.

FIGS. 16A and 16B are drawings illustrating the structure of volume information FL31 of the volume tag FL3. As shown in FIG. 16A, in the first 1byte of the volume information, checksum information for the data of the volume information is stored as the volume information checksum. Subsequently, 20-byte eject status, 4-byte reel diameter, 3-byte initialize count, and 72-byte volume information on tape describe the actual data constituting the volume information.

The contents of the volume information on tape FL311 are as shown in FIG. 16B, in which in the volume information on tape FL311, a 1-bit super high-speed search enable flag, 2-bit system log allocation flags, an always unload PBOT flag, a 1-bit AIT native flag, a 1-byte last valid partition number, and a 32-byte optional device area allocation map are provided along with some reserved areas.

The super high-speed search enable flag indicates whether a high-speed search function is enabled, using tape-position information stored as the super high-speed search map of the MIC. When this flag is set, for example, to "1" the high-speed search is enabled.

The system log allocation flags indicate where the tape cassette record of use, that is, the system log, is stored and are written only on the magnetic tape. Based on the system log allocation flags, it is possible to recognize that the record of use is not written in both the magnetic tape and the MIC, that the record of use is written in both the magnetic tape and the MIC, or that the record of use is written in only the MIC.

The always unload PBOT flag is used as a flag instructing the execution of unloading in the device area in the PBOT, even if a multipartition is formed on the magnetic tape 3 and the partition has an optional device area. The AIT, or Advanced Intelligent Tape, native flag is used as a flag representing the mode of the tape cassette. The last valid partition number represents the number of the last partition among the formed partitions. The optional device area map is composed of 256 bits, and each bit corresponds to each partition formed on the magnetic tape. When one bit is set to have a value of "1", the value indicates that an optional device area is formed in the partition corresponding to the bit.

Figure 17:
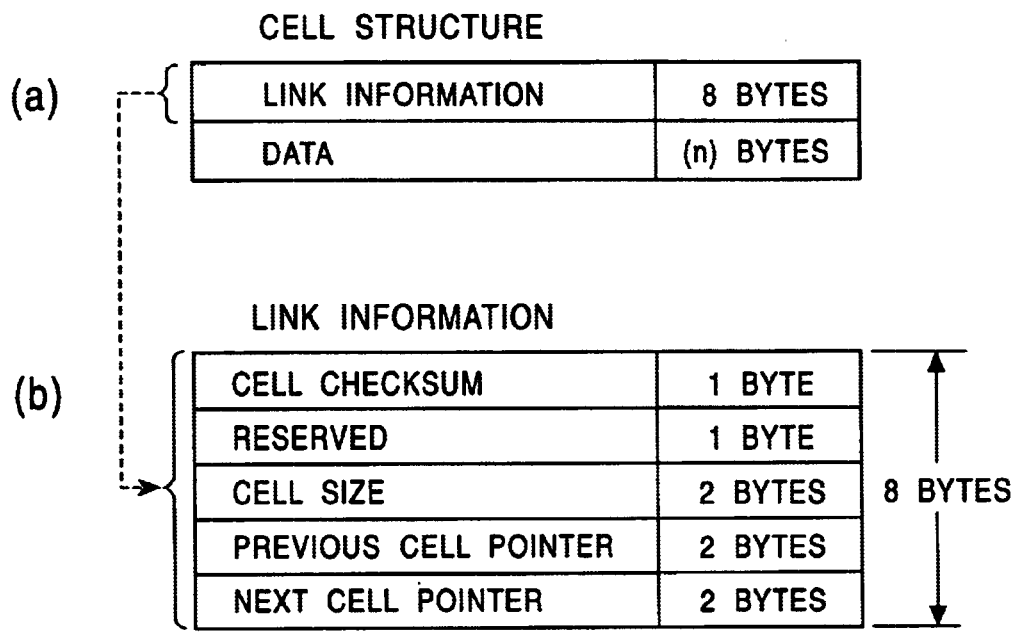
FIG. 17 illustrates an MIC cell structure in an embodiment of the present invention.

Next, cells stored in the field FL4 shown in FIG. 12 are described. As described above, the partition information cells, the user partition note cells, the super high-speed search map cell are stored in field FL4. The structure of each cell is shown in FIG. 17, wherein it is seen that one cell consists of 8-byte link information and n-byte data, which differs depending the type of cell, as shown in FIG. 17 illustration (a). The 8-byte link information is provided in each cell, and its structure is as shown in FIG. 17 illustration (b). First, a 1-byte cell checksum is provided as a checksum on the data in the cell, and a 2-byte cell size represents the size of the cell. Previous cell pointer and next cell pointer are actual linkage data, that is, data constituting the link structure, and when a plurality of cells of the same type are linked the previous cell pointer and the next cell pointer designate adjacent cells.

Cells having the above-described structure include a partition information cell, a super high-speed search map cell, a user volume note cell, and a user partition note cell. The cell size of the partition information cell is a fixed value, whereas the cell sizes of the other cells are variable values.

Figure 18:
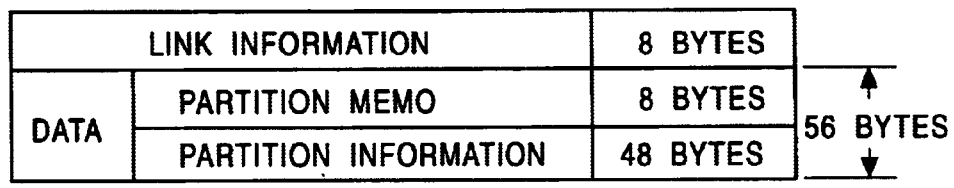
FIG. 18 illustrates an MIC partition information cell in an embodiment of the present invention.

The partition information cell having a fixed value as its cell size is described with reference to FIG. 18 and FIG. 19, wherein it is seen that the partition information cell is comprised of 8-byte link information and 56-byte data, as shown in FIG. 18. Among the 56-byte data, 8 bytes are used for partition memo and 48 bytes are used for partition information.

In this partition information forming a system log, various types of information on a record of use of the magnetic tape in the partition corresponding to the cell are stored and are used as information for the tape streamer drive to manage writing/reading operations by itself.

Figure 19:
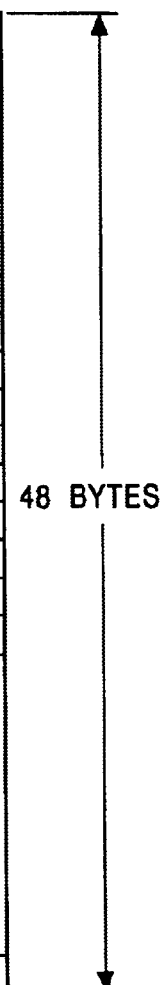
FIG. 19 illustrates data structure of an MIC partition information in an embodiment of the present invention.

The data structure of the partition information in one partition information cell corresponding to a certain partition is defined as shown in FIG. 19, wherein the 4-byte Previous Groups Written represents information on the number of groups in the partition that have been physically written on the magnetic tape since the time that the partition information was last updated. The 4-byte Total Groups Written represents the total number of groups that have been written in the partition, and this value accumulates until the tape cassette is out of condition due to the expiration of its life or is discarded. If data are being written on the magnetic tape by the tape streamer drive, the system controller of the tape streamer drive performs processing, whereby in the Previous Groups Written and the Total Groups Written their values are incremented in accordance with the number of groups newly written in the present writing operation.

The 3-byte Previous Groups Read represents the number of groups physically read since the time that the partition information was last updated. The 4-byte Total Groups Read represents a value obtained by accumulating numbers of groups that have been read. The 3-byte Total Rewritten Frames represents a value obtained by accumulating numbers of frames in which data rewriting was requested based on Read After Write or RAW in the partition. The 3-byte Total 3rd ECC Count represents a value obtained by accumulating numbers of groups in which error correction was performed using the C3 parity in the partition in the tape streamer drive according to this embodiment, the data read from the magnetic tape are error-corrected using the C1, C2, and C3 parities. The C3 parity is used when data cannot be restored using only C1 and C2 parities.

The 4-byte Access Count represents the number of times the tape streamer drive accessed the partition. The term accessed means the number of times the tape streamer drive physically passed the partition. This is, it includes the number of times writing to or reading from the partition was performed and the number of times the tape streamer drive passed the partition. The 4-byte Update Replace Count represents information on the accumulation of the number of times data was rewritten by updating on the magnetic tape 3 in the partition. That is, the information is the number of times of updating in the partition.

The 2-byte Previous Rewritten Frames represents information on the number of frames data rewriting was requested in connection with the above-described RAW since the time that the information of the partition was last updated. The 2-byte Previous 3rd ECC Count represents the number of groups on which error correction using the C3 parity was performed since the time that the information of the partition was last updated. The 3-byte Load Count represents a value obtained by accumulating the number of times the tape was loaded. The 3-byte Valid Maximum Absolute Frame Number represents information on a frame count up to the last frame regarded as valid in the partition.

Differently therefrom, the Maximum Absolute Frame Number in the last three bytes of the partition information represents information on the last frame count of the partition.

In 1-byte partition attribute flags, flag contents for bits are defined as follows: flags representing writing permission/prohibition and reading permission/prohibition in the partition, data-rewriting permission/prohibition based on RAW in the writing mode, and data-reading-retry permission/prohibition in the reading mode, are prepared as Prevent Write, Prevent Read, Prevent Write Retry, and Prevent Read Retry. In addition, a flag that is set when writing to the partition is performed and that is reset in accordance with the termination of the operation is prepared as a Partition Open Close flag.

As described above, the remote memory chip 4 is composed of a storage area having fields ranging from field FL1 to field FL4.

Figure 20A:
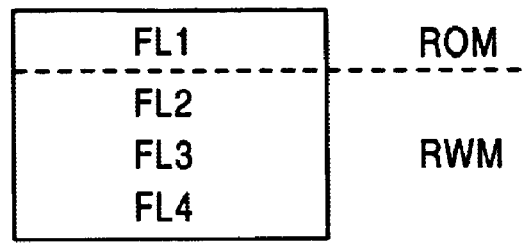
FIGS. 20A, 20B, and 20C are illustrations of MIC storage areas in an embodiment of the present invention.

The data items of the field FL1 shown in FIG. 12 are set as information that is not updated when the user uses a tape cassette, such as information of the tape cassette 1 itself, and information of the remote memory chip 4 itself In addition, it is preferable that the contents of the WORM flag in field FL11 representing the use of the tape cassette 1 not be changed. Accordingly, the storage area of the remote memory chip 4 is set by using field FL1 as a read-only memory or ROM region, and using fields FL2 to FL4 as read write memory or RWM regions in which reading/writing can be performed, as shown in FIG. 20A. This can prevent the user from changing the data items stored in field FL1.

Figure 20B:
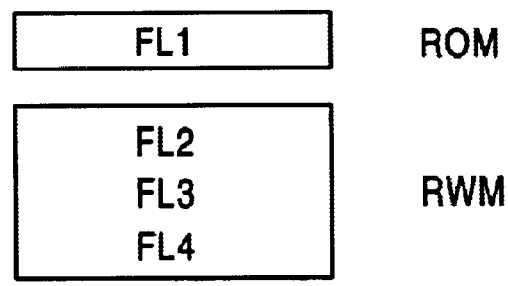

In addition, the remote memory chip 4 may be provided by using separate memories for the ROM region storing the information of field FL1 and the RWM region storing the information of fields FL2 to FL4, as shown in FIG. 20B.

Figure 20C:
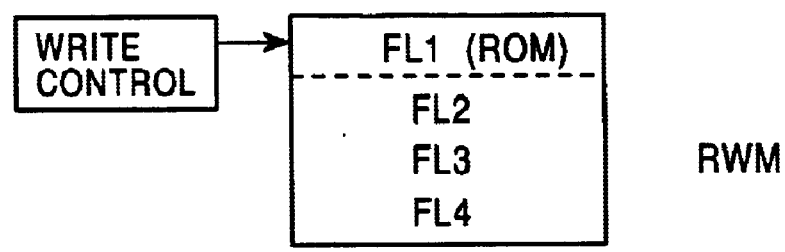

Moreover, as shown in FIG. 20C, by using the entire storage area of the remote memory chip 4 as an RWM region and by providing a write control means including a predetermined logic circuit for controlling writing for the field FL1 storage region, nothing other than write processing based on a predetermined password can be performed.

Otherwise, all the data of the RWM region are set to be 1, or to 0, as an initial state. The write control means pays attention to a particular bit at a particular address in a region treated as a ROM region. When the particular bit is 1, or 0, the write control means sets write processing to be valid for the entirety of the RWM region, namely, the entire area of the remote memory chip 4. Therefore, writing to the region treated as the ROM region can be performed, however, by setting the particular bit to be 0 or 1, the write control means can invalidate write processing to the ROM region.

By preventing the stored data contents in field FL1 from being changed, as described above, the WORM flag can be set as valid information. Therefore, by rewriting the WORM flag, data written as WORM cannot be changed and erased and a restriction in which only a predetermined use can be performed is realized.

Operation Control for WORM

FIG. 21 illustrates the WORM flag as the use-recognition information stored in field FL11 in the remote memory chip 4 in connection with this embodiment, and FIG. 21 shows cases corresponding to use numbers from 0 to 2, as well as other cases. The tape streamer drive 10 restricts writing and reading operations based on the use numbers. By way of example, the case in which the use number is 0 indicates that the tape cassette 1 is a recording medium for general uses and that operations are not restricted. In other words, the use number 0 represents the tape cassette 1 when it can be freely used by the user in accordance with its intended purpose. The tape streamer drive 10 performs operations in accordance with various commands supplied from the host computer 40 based on this user control.

The case in which the user number is 1 represents the tape cassette 1 when it is for the purpose of data distribution, firmware updating and the like. In this case, the tape cassette 1 is recognized as a read-only tape cassette. Accordingly, even when a command relating to the updating of written data, such as formatting, is supplied from the host computer the command is invalidated.

The case in which the use number is 2 indicates the tape cassette when it is for the purpose of WORM operation. In this case, in order to protect recorded data only writing that uses the last writing position in a partition as a writing start position is allowed. In other words, operations that require the updating of already written data, such as rewriting and erasing, are not allowed. Accordingly, for the tape cassette in which the use number is set to be 2 only additional writing or reading is allowed. Also, in this case a command relating to the updating of written data, such as formatting, is invalidated.

In order to perform additional writing in WORM operation, the cartridge serial number of the volume tag in FIG. 15 is stored in the data area A4 of the block shown in FIG. 7A. Accordingly, in the tape cassette in which the use is set to be WORM the same information is written in the remote memory chip and on the magnetic tape. Thereby, in the tape cassette the correspondence between the remote memory chip and the magnetic tape is established and by comparing the cartridge serial numbers stored in the remote memory chip 4 and on the magnetic tape, the execution of the reading operation can be controlled. In other words, when the remote memory chip of the tape cassette for WORM operation is exchanged for another remote memory chip for general use, their cartridge numbers will not coincide. This causes the operations of the tape streamer drive to be restricted.

In addition, values other than the use numbers 0, 1, and 2 represent reserve. Accordingly, when the use number is a value other than 0, 1, and 2, the tape streamer drive 10 informs the host computer that the tape streamer drive cannot recognize a use of the tape cassette and transfers its condition to an awaiting condition for unloading the tape cassette.

When the use number is 1 or 2, and a command that should be invalidated is supplied, the tape streamer drive informs the host computer that the tape streamer drive cannot execute the supplied command and transfers its condition to an unloading-awaiting condition.

When WORM operation is set, the cartridge serial number may be stored in data area A4, and information, such as character information WORM, enabling the recognition of WORM may simultaneously be written. When writing is performed with general use set, recognition information, such as character information NORMAL, representing data written with a use corresponding to general use may be written.

This enables the tape streamer drive to obtain the use-recognition information of the tape cassette also from the magnetic tape. Accordingly, even when the tape streamer drive cannot obtain the WORM flag from the remote memory chip, it can recognize a use of the tape cassette.

Although the use numbers are recognized by the tape streamer drive into which the tape cassette is loaded, the tape streamer drive may not be designed to always recognize the use numbers 0, 1, and 2. For example, the tape streamer drive that is designed to use only tape cassettes for general use ignores the need for recognizing WORM and transfers its condition to the awaiting condition for unloading the tape cassette.

The tape streamer drive that can recognize the use number 1 may be designed so as to, at least, read data. In other words, the tape streamer drive as a read-only drive unit may be designed to recognize the use number 1.

The tape streamer drive that is designed to recognize the use numbers 0 and 1 can recognize whether the loaded tape cassette is for general use or for WORM operation and can selectively meet general uses and a WORM use intended for data protection.

The use number of the WORM flag is detected under control of the system controller when the tape cassette is loaded into the tape streamer drive, and various tape streamer drive operations are subsequently controlled based on the use number.

Figure 22:
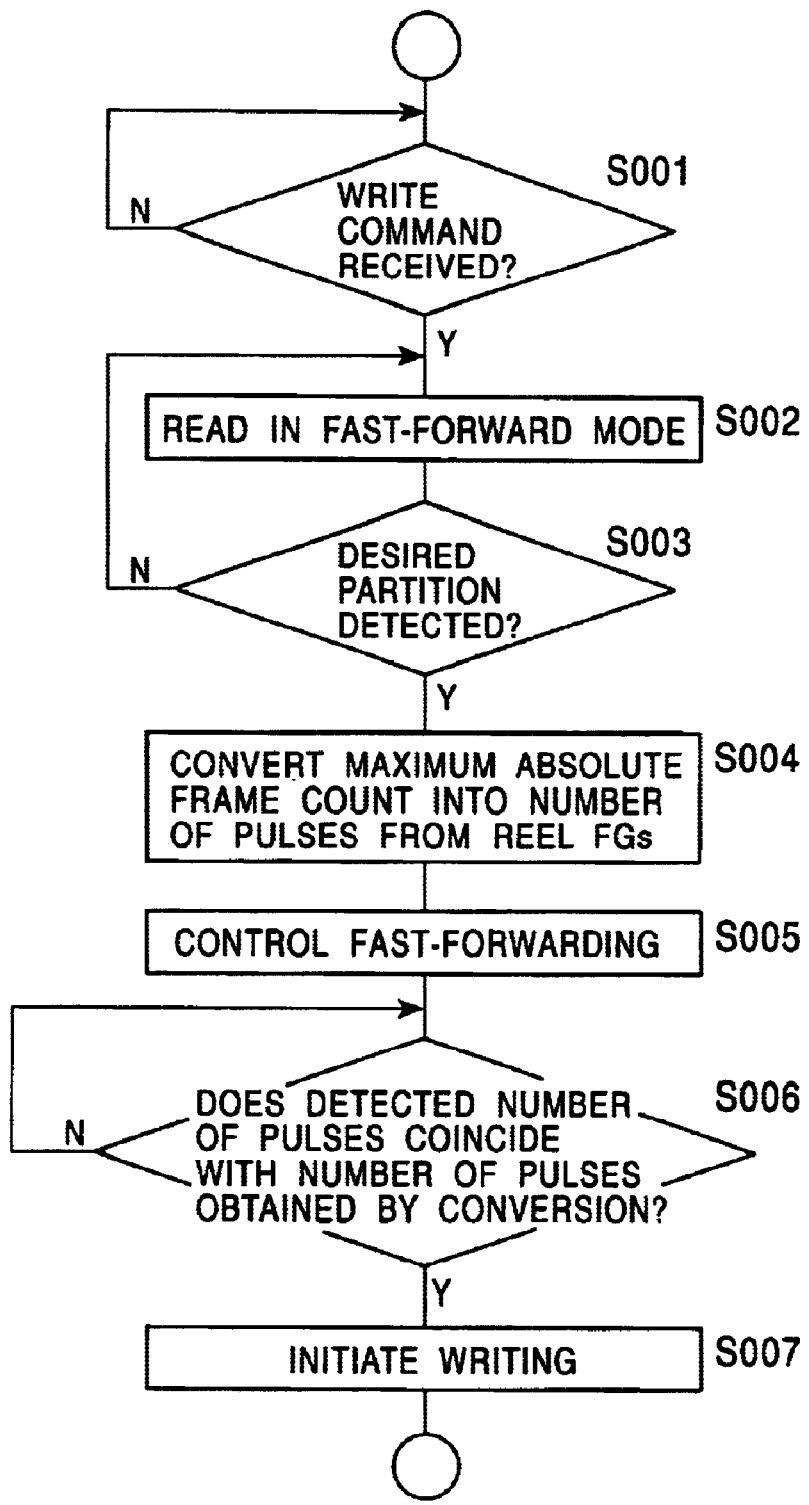
FIG. 22 is a flowchart illustrating a writing operation performed when a tape cassette is set for WORM operation.

FIG. 22 is a flowchart illustrating a process of the system controller when recording to the tape cassette, in which WORM operation is set with the WORM flag, is performed. The flowchart of FIG. 22 shows the process when the tape cassette 1 is loaded into the tape streamer drive, and the WORM flag detected from the remote memory chip is set to WORM. When WORM operation is set for the tape cassette and the host computer supplies a write command (S001), control is initially performed in which moving to a partition in which data are written is performed. At this time, reading in fast-forward mode is executed (S002). In this condition, a partition ID of an ID area written on the magnetic tape, described with reference to FIG. 11, is detected (S003), and the reading in fast-forward mode is executed until the partition ID of the desired partition is detected. When the desired partition is reached by performing steps S002 and S003, transfer to a process for detecting the last frame in the partition is performed.

Now, an example of a method for calculating the present position on the magnetic tape 3, that is, the distance from the beginning position of the partition to a frame in the partition designated by the maximum absolute frame count, is described.

When the distance from the present position to the desired position is represented by L, where L equals a maximum absolute frame count based on a linear track pitch times two, wherein the linear track pitch is doubled since this expression assumes a format in which one frame corresponds to two tracks, as shown in FIG. 6.

When the thickness of the magnetic tape 3 is represented by t, the diameter of the reel hub (2A or 2B) is represented by D, and the number of revolutions of the reel hub (2A or 2B) is represented by n, distance L can be found by the following expression (1). Information on the thickness t of the magnetic tape 3 can be obtained by the physical characteristic ID described in relation to FIG. 13.

$$L = \frac{\pi(\Phi/2 + nt)^2 - \pi(\Phi/2)^2}{t} \quad (1)$$

(1)

In expression (1), the first term of the numerator on the right side corresponds to any one of the reel hubs 2A and 2B, and the second term of the numerator on the right side corresponds to the other one of the reel hubs 2A and 2B. Accordingly, each term represents an area of the magnetic tape wound around each reel hub.

Based on expression (1), the number of revolutions of the reel hubs 2A and 2B for reaching the frame corresponding to the maximum absolute frame count can be found. Therefore, by performing a fast-forwarding operation until the numbers of FG pulses currently output from the reel FGs 29C and 29D become values corresponding to the number of revolutions of the reel hubs 2A and 2B, the magnetic tape 3 can be forwarded to the target position.

By converting the value of the maximum absolute frame count into the number of pulses of the reel FGs 29C and 29D (S004), as described above, control of fast-forwarding controls the magnetic tape 3 to be run (S005). The number of FG pulses detected in accordance with the fast-forwarding operation and the number of pulses calculated in step S004 are compared and, when both numbers of pulses coincide, it is determined that a position corresponding to the maximum absolute frame count is reached. From that position, the writing of data is initiated (S007).

By performing steps S004 and S005, as described above, moving to an area of the magnetic tape in which writing has not been performed can be performed. By initiating writing at this position, new data can additionally be written without changing the already written data. The maximum absolute frame count is also updated in accordance with the written data capacity by performing the additional writing. Thus, by using the position corresponding to the maximum absolute frame count as the start of writing, additional writing can be performed without erasing the already written data.

When additional writing of data is performed in step S007, the cartridge serial number is stored in the data area A3 of the block shown in FIG. 7A, together with the write data. This can establish the correspondence between the remote memory chip and the magnetic tape in the tape cassette. In this fashion the reading operation can be controlled.

Figure 23:
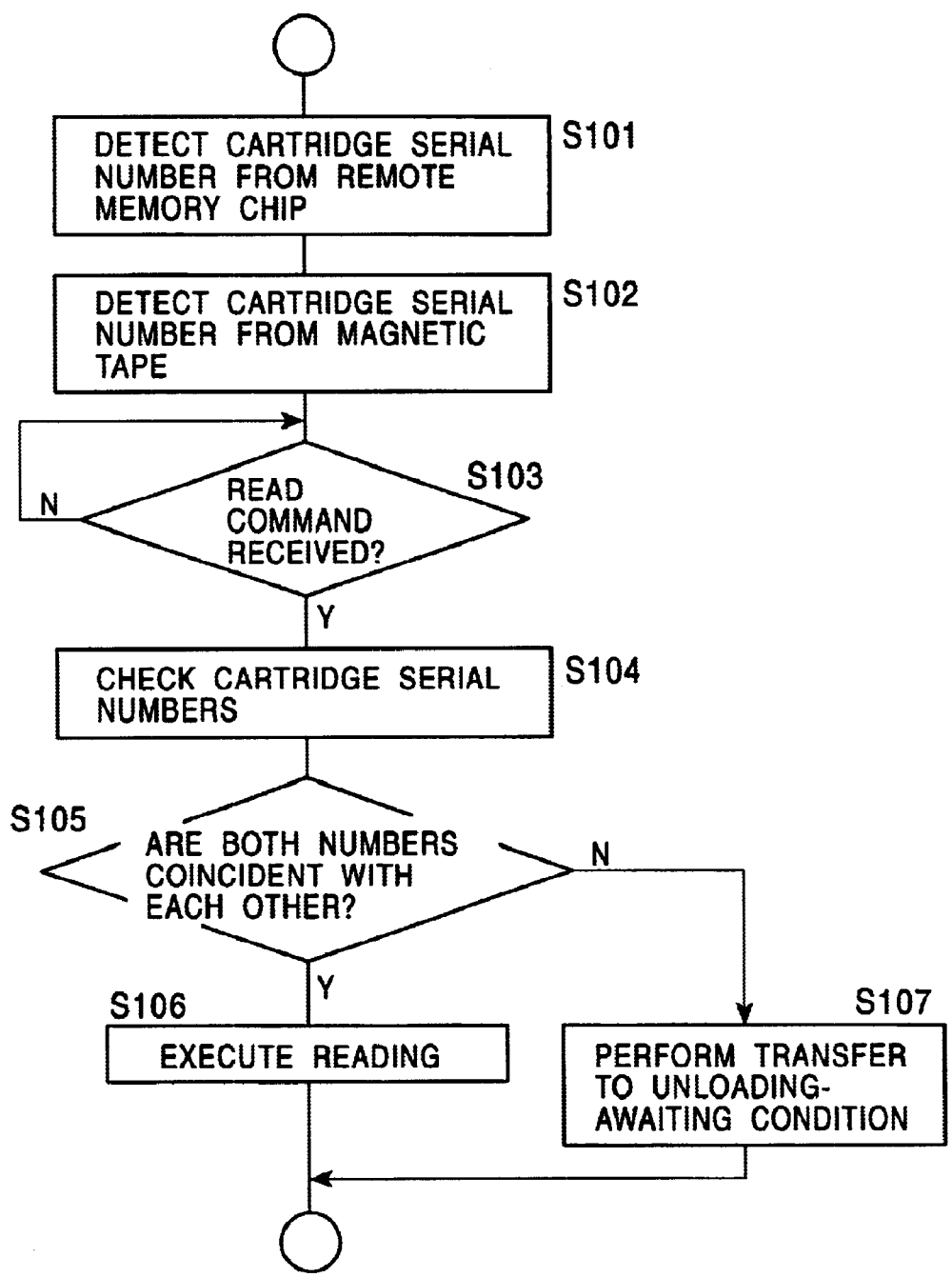
FIG. 23 is a flowchart illustrating in a process performed as a result of comparing pieces of tape cassette's identification information obtained from a remote memory chip and a magnetic tape.

When the first writing to the tape cassette is performed, writing to the tape cassette from the tape's beginning partition is performed. FIG. 23 is a flowchart illustrating a process by the system controller in the case where writing is performed when the cartridge serial number of the magnetic tape is written in the tape streamer drive, and the tape cassette, in which WORM operation is set, is loaded.

When the tape cassette is loaded into the tape streamer drive, a cartridge serial number is at first detected from the remote memory chip (S101), and a cartridge serial number written on the magnetic tape is detected (S102). When the host computer supplies a reading command (S103), the cartridge serial number written in the remote memory chip and the cartridge serial number written on the magnetic tape are compared (S104). If the process has determined that the cartridge serial numbers coincide with each other (S105), the process performs control for performing transfer to a predetermined operation, for example, reading (S106). If the process has determined that the cartridge serial numbers do not coincide with each other, the process inhibits the reading operation from being executed and performs transfer to a condition for awaiting the unloading of the tape cassette 1 (S107).

This makes it possible to inhibit data reading if the remote memory chip is exchanged for another remote memory chip in the tape cassette. Accordingly, even when the other remote memory chip is set for general use, possible operations can be restricted. Thus, data written on the magnetic tape can be treated so as not to be revealed to an outsider other than a predetermined user.

Similarly, by inhibiting the writing operation when the cartridge serial numbers do not coincide, data written as WORM on the magnetic tape can be prevented from being changed. When the cartridge serial numbers do coincide, additional writing of data may be allowed.

In the foregoing embodiment, relative to FIGS. 3A and 3B construction in which the tape cassette 1 is provided with the remote memory chip 4 has been described, however, the present invention may similarly be applied to the tape cassette 1, which is provided with the contact memory 104.

As described above, a tape drive unit of the present invention reads use-recognition information from a memory included in a tape cassette, and controls operations to the tape cassette based on the use-recognition information.

This enables only additional writing from the last writing position, and inhibits the rewriting and erasing of already written data. Accordingly, the tape drive unit can prevent the existing written data from being changed.

In addition, when writing is performed, identification information, such as the serial number of the tape cassette stored in the memory, is written on the magnetic tape together with write data. This enables the magnetic tape and the memory in the tape cassette to have common information.

Moreover, because an operation of reading the magnetic tape based on the use-recognition information can be performed, protection of written data is realized.

A tape drive unit of the present invention compares identification information written on a magnetic tape and identification information written in a memory, such as a tape cassette serial number, and can execute predetermined operations based on results of the comparison. Accordingly, only when the identification information on the magnetic tape and the identification information in the memory coincide with each other, are reading from and writing to the magnetic tape allowed. This enables protection of written data in a tape cassette having another magnetic tape or memory as a result of an exchange.

In a recording medium of the present invention, use-recognition information designating a use for a tape cassette is stored in a memory inside the cassette. Accordingly, a use for the recording medium can be instructed to a tape drive unit into which the recording medium is loaded, and the recording medium enables the tape drive unit to execute operations corresponding to the uses. Since the use-recognition information is stored in a read-only area of the memory, the use for the recording medium can be treated so as not to be changed by changing the content of the use-recognition information.

In addition, both the memory and the magnetic tape store identification information, such as a tape cassette serial number. In other words, the same information, which is common in the memory and the magnetic tape is stored, thereby enabling the detecting of a correspondence between the memory and the magnetic tape included in the same tape cassette. Accordingly, when the memory is exchanged for one from another tape cassette, the coincidence of identification information is lost. In this case, the tape drive unit restricts writing and reading operations, thereby inhibiting written data from being disclosed, or inhibiting erasing and rewriting operations for changing the written data from being executed.

What is claimed is:

1. A tape drive apparatus comprising:
   tape drive means for running a magnetic tape and writing/reading information to/from the magnetic tape, wherein the magnetic tape is enclosed in a tape cassette;
   memory drive means for reading and writing management information by performing a predetermined communication process with a memory, wherein the memory is included in the tape cassette for storing the management information for managing the writing/reading of information to/from the magnetic tape by the tape drive means;
   a use-recognition information detector for detecting from the memory use-recognition information designating a use for the tape cassette; and
   a controller for controlling an operation of the tape drive means based on the use-recognition information detected by the detector,
   wherein the use-recognition information is stored in a read-only area in said memory.

2. The tape drive apparatus according to claim 1, wherein, when said controller controls the tape drive means for writing data to the magnetic tape, said controller controls said tape drive means to use a last writing position on the magnetic tape as a writing start position.

3. The tape drive apparatus according to claim 1, wherein said controller controls the tape drive means to write an identification information of the tape cassette stored in said memory together with write data on the magnetic tape.

4. The tape drive apparatus according to claim 3, further comprising:
   an identification-information comparator for comparing the identification information stored in said memory and the identification information written on the magnetic tape.

5. The tape drive apparatus according to claim 4, wherein said controller controls the operation of the tape drive means based on a result of a comparison of the identification information comparator.

6. The tape drive apparatus according to claim 1, wherein said controller performs data reading based on the use-recognition information detected by the detector.

7. The tape drive apparatus according to claim 1, wherein said memory comprises a read-only area and a rewritable area.

8. The tape drive apparatus according to claim 1, wherein said memory drive means comprises interface means for transmitting data between the memory and the memory drive means.

9. A tape drive apparatus comprising:
   tape drive means in which, when a tape cassette including a magnetic tape is loaded, said tape drive means runs the magnetic tape and writes/reads information to/from the magnetic tape;
   memory drive means in which, when the tape cassette includes a memory for storing management information for managing the writing/reading of information to/from the magnetic tape, said memory drive means reads or writes the management information by performing a predetermined communicating process with the memory;
   a first identification-information detector for detecting first identification information of said tape cassette stored in said memory;
   a second identification-information detector for detecting second identification information of said tape cassette stored on the magnetic tape;
   identification-information determining means for determining whether the first and second identification information detected respectively by the first and second identification-information detectors coincide with each other;
   a controller for executing only a particular operation based on a result of a determination by said identification-information determining means.

10. The tape drive apparatus according to claim 9, wherein when said controller controls the tape drive means for writing data to the magnetic tape and said controller further controls said tape drive means to use a last writing position on the magnetic tape as a writing start position.

11. The tape drive apparatus according to claim 9, wherein said controller controls the tape drive means to write on the magnetic tape an identification information of the tape cassette stored in said memory, as well as to write data on the magnetic tape.

12. The tape drive apparatus according to claim 9, wherein said controller performs data reading based on the use-recognition information.

13. The tape drive apparatus according to claim 9, wherein said memory comprises a read-only area and a rewritable area.

14. A recording medium comprising:
   a tape cassette including a magnetic tape; and
   a memory attached to said tape cassette, said memory being provided for storing management information for managing writing/reading to/from said magnetic tape,
   wherein said memory further stores use-recognition information designating a use for said tape cassette, and
   wherein the use-recognition information is stored in a read-only area in said memory.

15. The recording medium according to claim 14, wherein said memory comprises a read-only area and a rewritable area.

16. The recording medium according to claim 14, wherein said memory comprises interface means for transmitting data of the management information.

17. A recording medium comprising:
   a tape cassette including a magnetic tape; and
   a memory attached to said tape cassette, said memory being provided for storing management information for managing writing/reading to/from said magnetic tape,
   wherein identification information of said tape cassette is store in said memory and is stored in said magnetic tape, and wherein the use-recognition information is stored in read-only area in said memory.

18. The recording medium according to claim 17, wherein said memory comprises a read-only area and a rewritable area.

19. The recording medium according to claim 17, wherein said memory comprises interface means for transmitting data of the management information.

* * * * *